United States Patent
Guyot et al.

(10) Patent No.: US 11,249,921 B2
(45) Date of Patent: Feb. 15, 2022

(54) PAGE MODIFICATION ENCODING AND CACHING

(71) Applicant: Western Digital Technologies, Inc., San Jose, CA (US)

(72) Inventors: Cyril Guyot, San Jose, CA (US); Yuval Cassuto, Haifa (IL); Adam Manzanares, Union City, CA (US); Filip Blagojevic, Albany, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/867,793

(22) Filed: May 6, 2020

(65) Prior Publication Data

US 2021/0349828 A1    Nov. 11, 2021

(51) Int. Cl.
| | |
|---|---|
| *G06F 12/10* | (2016.01) |
| *G06F 12/1009* | (2016.01) |
| *G06F 12/0811* | (2016.01) |
| *G06F 3/06* | (2006.01) |
| *G06F 9/38* | (2018.01) |

(52) U.S. Cl.
CPC ........ *G06F 12/1009* (2013.01); *G06F 3/0653* (2013.01); *G06F 3/0679* (2013.01); *G06F 9/3816* (2013.01); *G06F 9/3818* (2013.01); *G06F 12/0811* (2013.01); *G06F 3/0623* (2013.01)

(58) Field of Classification Search
CPC ............... G06F 12/1009; G06F 3/0679; G06F 12/0811; G06F 9/3816; G06F 3/0653; G06F 3/0623; G06F 9/3818
USPC ........................................................ 711/206
See application file for complete search history.

(56) References Cited

U.S. PATENT DOCUMENTS

| | | |
|---|---|---|
| 4,420,807 A | 12/1983 | Nolta et al. |
| 5,608,876 A | 3/1997 | Cohen et al. |
| 6,772,296 B1 | 8/2004 | Mathiske |
| 6,856,556 B1 | 2/2005 | Hajeck |
| 7,023,726 B1 | 4/2006 | Chen et al. |
| 7,126,857 B2 | 10/2006 | Hajeck |
| 7,216,211 B2 | 5/2007 | Munguia et al. |

(Continued)

FOREIGN PATENT DOCUMENTS

WO    2012134641 A2    10/2012

OTHER PUBLICATIONS

Pending U.S. Appl. No. 16/921,719, filed Jul. 6, 2020, entitled "Data Access in Data Storage Device Including Storage Class Memory", Dubeyko et al.

(Continued)

*Primary Examiner* — Hua J Song
(74) *Attorney, Agent, or Firm* — Barry IP Law, P.C.

(57) ABSTRACT

Modifying a page stored in a non-volatile storage includes receiving one or more requests to modify data stored in the page with new data. One or more lines are identified in the page that include data to be modified by the one or more requests. The identified one or more lines correspond to one or more respective byte ranges each of a predetermined size in the page. Encoded data is created based on the new data and respective locations of the one or more identified lines in the page. The encoded data is cached, and at least a portion of the cached encoded data is used to rewrite the page in the non-volatile storage to include at least a portion of the new data.

24 Claims, 9 Drawing Sheets

(56) References Cited

U.S. PATENT DOCUMENTS

| | | |
|---|---|---|
| 7,386,655 B2 | 6/2008 | Gorobets et al. |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,904,619 B2 | 3/2011 | Danilak |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,979,601 B2 | 7/2011 | Berenbaum et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | DeForest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, I et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,631,191 B2 | 1/2014 | Hashimoto |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,392 B1 | 5/2014 | Asnaashar et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,903,995 B1 | 12/2014 | Basak et al. |
| 8,947,803 B1 | 2/2015 | Yamakawa et al. |
| 9,015,123 B1 | 4/2015 | Mathew et al. |
| 9,116,800 B2 | 8/2015 | Post et al. |
| 9,189,387 B1 | 11/2015 | Taylor et al. |
| 9,342,453 B2 | 5/2016 | Nale et al. |
| 9,619,174 B2 | 4/2017 | Chen et al. |
| 9,836,404 B2 | 12/2017 | Ummadi et al. |
| 9,857,995 B1 | 1/2018 | Malina et al. |
| 10,126,981 B1 | 11/2018 | Malina et al. |
| 10,423,536 B2 | 9/2019 | Noguchi et al. |
| 10,482,009 B1 | 11/2019 | Sabol et al. |
| 10,496,544 B2 | 12/2019 | Wang et al. |
| 2008/0148048 A1 | 6/2008 | Govil et al. |
| 2010/0037002 A1 | 2/2010 | Bennett |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0166891 A1 | 6/2012 | Dahlen et al. |
| 2012/0210068 A1 | 8/2012 | Joshi et al. |
| 2012/0239860 A1 | 9/2012 | Atkisson et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0317377 A1 | 12/2012 | Palay et al. |
| 2012/0324191 A1 | 12/2012 | Strange et al. |
| 2012/0331016 A1 | 12/2012 | Janson et al. |
| 2013/0024605 A1* | 1/2013 | Sharon ................. G06F 11/1044 711/103 |
| 2013/0080687 A1 | 3/2013 | Nemazie et al. |
| 2013/0091321 A1 | 4/2013 | Nishtala et al. |
| 2013/0132638 A1 | 5/2013 | Horn et al. |
| 2013/0145106 A1 | 6/2013 | Kan |
| 2013/0205114 A1 | 8/2013 | Badam et al. |
| 2013/0290793 A1 | 10/2013 | Booth et al. |
| 2014/0006686 A1 | 1/2014 | Chen et al. |
| 2014/0059405 A1 | 2/2014 | Syu et al. |
| 2014/0101369 A1 | 4/2014 | Tomlin et al. |
| 2014/0108703 A1 | 4/2014 | Cohen et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2014/0226389 A1 | 8/2014 | Ebsen et al. |
| 2014/0351515 A1 | 11/2014 | Chiu et al. |
| 2015/0058534 A1 | 2/2015 | Lin |
| 2015/0142996 A1 | 5/2015 | Lu |
| 2015/0302903 A1 | 10/2015 | Chaurasia et al. |
| 2015/0363320 A1 | 12/2015 | Kumar et al. |
| 2016/0027481 A1 | 1/2016 | Hong |
| 2016/0118130 A1 | 4/2016 | Chadha et al. |
| 2016/0313943 A1 | 10/2016 | Hashimoto et al. |
| 2016/0342357 A1 | 11/2016 | Ramamoorthy et al. |
| 2016/0357463 A1 | 12/2016 | DeNeui et al. |
| 2016/0378337 A1 | 12/2016 | Horspool et al. |
| 2017/0024332 A1 | 1/2017 | Rui et al. |
| 2017/0147499 A1 | 5/2017 | Mohan et al. |
| 2017/0160987 A1 | 6/2017 | Royer, Jr. et al. |
| 2017/0185347 A1 | 6/2017 | Flynn et al. |
| 2017/0228170 A1 | 8/2017 | Chen et al. |
| 2017/0270041 A1 | 9/2017 | Talagala et al. |
| 2017/0286291 A1 | 10/2017 | Thomas |
| 2018/0004438 A1 | 1/2018 | Hady |
| 2018/0032432 A1 | 2/2018 | Kowles |
| 2018/0095898 A1 | 4/2018 | Khosravi et al. |
| 2018/0150404 A1 | 5/2018 | Kim et al. |
| 2018/0307602 A1* | 10/2018 | Xu ...................... G06F 11/1612 |
| 2018/0307620 A1 | 10/2018 | Zhou |
| 2018/0349041 A1 | 12/2018 | Zhou et al. |
| 2019/0163375 A1 | 5/2019 | Amidi et al. |

(56) References Cited

U.S. PATENT DOCUMENTS

| | | | |
|---|---|---|---|
| 2019/0188153 A1 | 6/2019 | Benisty et al. | |
| 2019/0310796 A1 | 10/2019 | Perez et al. | |
| 2019/0339904 A1 | 11/2019 | Myran et al. | |
| 2019/0347204 A1 | 11/2019 | Du et al. | |
| 2020/0004628 A1* | 1/2020 | Ben-Rubi | G06F 12/0875 |

OTHER PUBLICATIONS

International Search Report and Written Opinion dated Nov. 6, 2020 from International Application No. PCT/US2020/037713, 8 pages.

Karypidis et al.; "The tangible file system"; 23rd International Conference on Distributed Computing Systems Workshops, 2003; Proceedings, Providence, Rhode Island, pp. 268-273.

Seltzer et al.; "An NVM Carol: Visions of NVM Past, Present, and Future"; 2018 IEEE 34th International Conference on Data Engineering; Paris, 2018; pp. 15-23; available at: https://www.researchgate.net/publication/328522956_An_NVM_Carol_Visions_of_NVM_Past_Present_and_Future.

Xu et al.; "CAST: A page-level FTL with compact address mapping and parallel data blocks"; 2012 IEEEE 31st International Performance Computing and Communications Conference (IPCCC); Austin, TX; 2012; pp. 142-151 available at: https://ieeexplore.IEEE.org/document/6407747.

Phil Mills, "Storage Class Memory—the Future of Solid State Storage," http://www.snia.org/sites/default/education/tutorials/2009/fall/solid/PhilMills_The_Future_of_Solid_State_Storage.pdf., SNIA Education, 2009.

Pending U.S. Appl. No. 16/176,997, filed Oct. 31, 2018, entitled "Tiered Storage Using Storage Class Memory", James N. Malina.

Pending U.S. Appl. No. 16/683,095, filed Nov. 13, 2019, entitled "Storage Class Memory Access", Manzanares et al.

Kang et al.; "Subpage-based Flash Translation Layer For Solid State Drivers"; Jan. 2006; 10 pages; available at: https://cs.kaist.ac.kr/fileDownload?kind=tech&sn=340.

Kim et al.; "Partial Page Buffering for Consumer Devices with Flash Storage"; Proceedings 2013 IEEE 3rd International Conference on Consumer Electronics—Berlin, ICCE-Berlin 2013 (p. 177-180); available at: https://hanyang.elsevierpure.com/en/publications/partial-page-buffering-for-consumer-devices-with-flash-storage.

Wu et al.; "Delta-FTL: Improving SSD Lifetime via Exploiting Content Locality"; Apr. 10-13, 2012; 13 pages; available at: https://cis.temple.edu/~he/publications/Conferences/DeltaFTL-Eurosys12.pdf.

Xia et al.; "Edelta: A Word-Enlarging Based Fast Delta Compression Approach"; Jul. 2015; 5 pages; available at https://www.usenix.org/system/files/conference/hotstorage15/hotstorage15-xia.pdf.

Pending U.S. Appl. No. 16/196,077, filed Nov. 20, 2018, entitled "Data Access in Data Storage Device Including Storage Class Memory", Dubeyko et al.

Hitachi Vantara; "Hitachi Accelerated Flash 2.0"; Sep. 2018; 20 pages; available at: https://www.hitachivantara.com/en-US/pdfd/white-paper/accelerated-flash-whitepaper.pdf.

Pending U.S. Appl. No. 16/246,425, filed Jan. 11, 2019, entitled "Container Key Value Store for Data Storage Devices", Sanjay Subbarao.

Pending U.S. Appl. No. 16/246,401, filed Jan. 11, 2019, entitled "Fine Granularity Translation Layer for Data Storage Devices", Sanjay Subbarao.

* cited by examiner

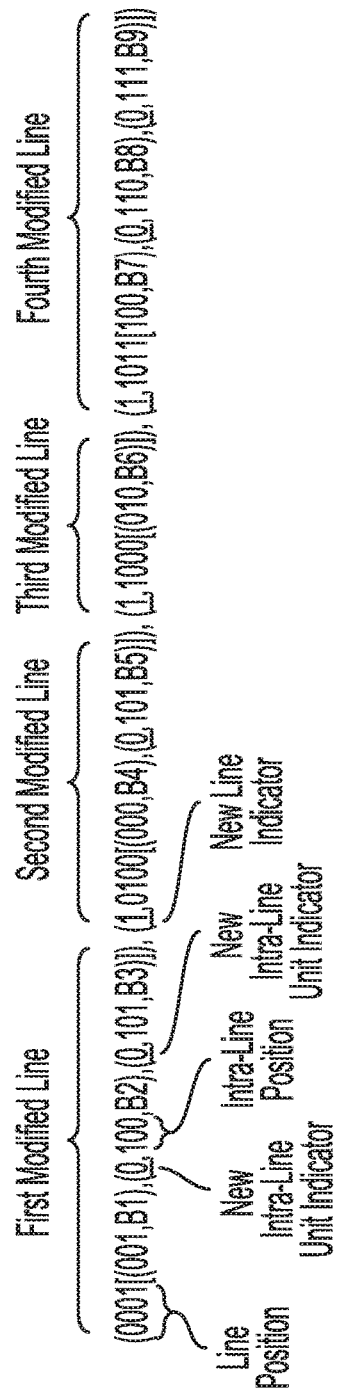
FIG. 4B
FIG. 4C
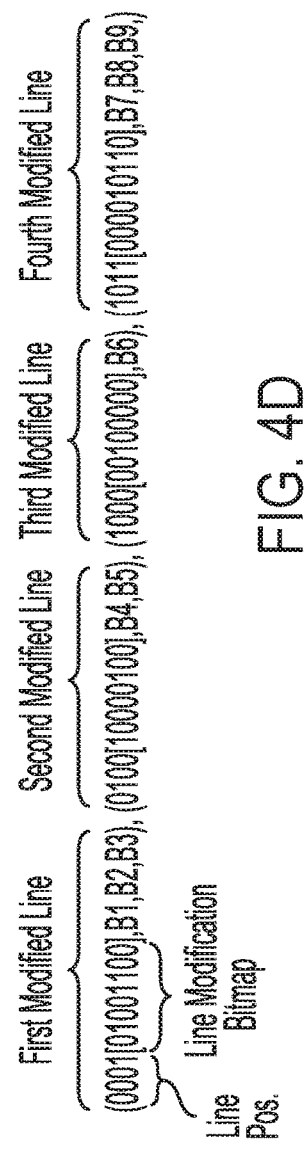
FIG. 4D

PAGE MODIFICATION ENCODING AND CACHING

BACKGROUND

Main memory, such as Dynamic Random Access Memory (DRAM), is typically used by processor circuitry to access data with a finer granularity than from a non-volatile storage, such as from a Hard Disk Drive (HDD) including rotating magnetic disks or a Solid State Drive (SSD) including flash memory. For example, non-volatile storage in an HDD or SSD may only be capable of writing data in units of a page size, such as in 4 KB pages, while a DRAM memory may be capable of writing data in smaller units of a single byte (i.e., byte-addressable data).

This difference in the smallest writable unit between data written in the main memory, as compared to data written in the non-volatile storage, typically results in write amplification where an entire page stored in the non-volatile storage is rewritten for a relatively small modification (e.g., a few bytes) to the page. This write amplification is a result of a read-modify-write operation to read the original page, modify the page for the changed portions of the page, and then rewrite the entire page in the non-volatile storage to include the changed portions and the original data for the unchanged portions. Such read-modify-write operations amplify the time, processing resources, and memory resources needed to rewrite the entire page for only a relatively small portion of the page that was modified. In addition, some types of storage media, such as NAND flash, may have a limited write endurance where the usable life of the storage media degrades after a large number of writes to the same location. Accordingly, a more efficient way of modifying pages in a non-volatile storage can improve the use of processing and memory resources, and prolong the usable life of certain types of storage media.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 4B illustrates a first example encoding scheme for creating encoded data for the modifications shown in FIG. 4A according to one or more embodiments.

FIG. 4C illustrates a second example encoding scheme for creating encoded data for the modifications shown in FIG. 4A according to one or more embodiments.

FIG. 4D illustrates a third example encoding scheme for creating encoded data the modifications shown in FIG. 4A according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown or described in detail to avoid unnecessarily obscuring the various embodiments.

Example Systems

Figure 1:
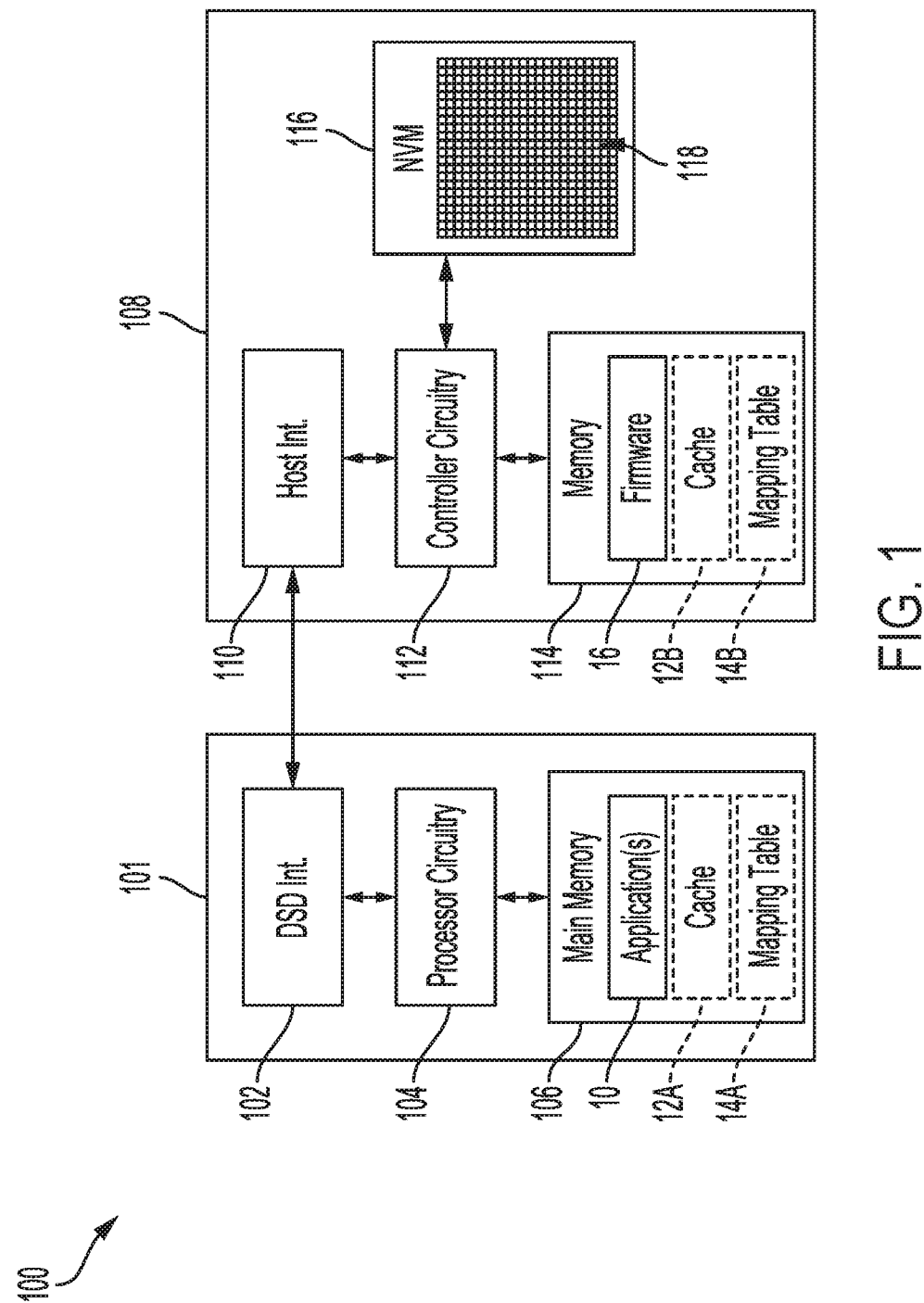
FIG. 1 is a block diagram of an example system including a host and a Data Storage Device (DSD) according to one or more embodiments.

FIG. 1 is a block diagram of example system 100 including host 101 and Data Storage Device (DSD) 108 according to one or more embodiments. In the example of FIG. 1, host 101 communicates with DSD 108 to retrieve data from and store data in pages 118 of non-volatile storage 116 of DSD 108. Host 101 and DSD 108 may be separate devices, or may be housed together as part of a single electronic device, such as, for example, a server, computing device, embedded device, desktop, laptop or notebook computer, or other type of electronic device such as a tablet, smartphone, network media player, portable media player, television, digital camera, or Digital Video Recorder (DVR). In other implementations, host 101 may be a client computer, a processing node, or a storage controller, and DSD 108 may be a server or storage node in a network, such as in a cloud storage network or data center. As used herein, a host can refer to a device that is capable of issuing commands to a DSD to store data or retrieve data. In this regard, host 101 may include another storage device such as a smart DSD that is capable of executing applications and communicating with other DSDs.

As shown in FIG. 1, DSD 108 includes storage 116 that provides non-volatile storage of data in pages 118, with each page having a predetermined page size, such as 512B, 2 KB, or 4 KB. As used herein, a page refers to a unit of storage or a size of data that is written at one time in non-volatile storage 116. In this regard, the term "page" as used herein can include a block, and the term "page size" as used herein can include a block size.

Storage 116 is shown as a solid-state memory in the example of FIG. 1, such as where DSD 108 is a Solid-State Drive (SSD). Other implementations, storage 116 may include a different type of non-volatile storage media, such as one or more rotating magnetic disks, as in the case where DSD 108 is a Hard Disk Drive (HDD). Some implementations of DSD 108 may include multiple types of non-volatile storage media with data written in a particular page size or smallest writable unit for writing data in storage 116. For example, some implementations of DSD 108 may include a Solid-State Hybrid Drive (SSHD) that includes at least one rotating magnetic disk where data is written in units having a page size corresponding to a sector size of a disk and at least one solid-state memory where data is written in units having a page size corresponding to a page in the solid-state state memory. The page sizes of the different types of non-volatile storage media may be the same (e.g., 4 KB page sizes for both media types) or may be different (e.g., a 512B page size for a disk and a 4 KB page size for a solid-state memory).

While the description herein refers to solid-state memory generally, it is understood that solid-state memory may comprise one or more of various types of memory devices such as flash integrated circuits, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), Fast NAND, 3D-XPoint memory, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. The use of some types of solid-state memory referred to above that are capable of writing data at a byte-level may be configured for writing data in larger page sized units or at a page-level in implementations where such types of solid-state memory are used for storage 116 in DSD 108.

Host 101 includes DSD interface 102, processor circuitry 104, and main memory 106, which can be accessed at a byte-level (e.g., at a cache line size of L1, L2, and/or L3 caches of a CPU of processor circuitry 104) that is less than a page size that is used to write data in pages 118 of storage 116. As discussed in more detail below, modifications to pages 118 in some embodiments can be encoded or compressed by processor circuitry 104 of host 101 for caching in cache 12A of main memory 106 before rewriting the pages with the modified data. In such embodiments, cache 12B and mapping table 14B may be omitted from memory 114 of DSD 108, which is indicated in FIG. 1 with dashed lines for cache 12B and mapping table 14B.

In other embodiments, the encoding and caching of modifications to pages 118 can be performed by controller circuitry 112 of DSD 108. In such embodiments, memory 114 of DSD 108 can be used to cache the encoded modifications in cache 12B before rewriting the pages with the modified data. In such embodiments, cache 12A and mapping table 14A may be omitted from main memory 106 of host 101, which is indicated in FIG. 1 with dashed lines for cache 12A and mapping table 14A.

As used herein, the terms "encode", "encoding", and "encoded" refer to changing a format or scheme for representing data, with the goal of reducing the size needed for storing the data in its encoded state. In this regard, encode, encoding, and encoded can be viewed as including data compression.

In the example of FIG. 1, host 101 includes processor circuitry 104 for executing computer-executable instructions, such as application(s) 10, which can include, for example, an Operating System (OS) of host 101. Processor circuitry 104 can include circuitry such as one or more processors for executing instructions and can include, for example, a Central Processing Unit (CPU), a Graphics Processing Unit (GPU), a microcontroller, a Digital Signal Processor (DSP), an Application Specific Integrated Circuit (ASIC), a Field Programmable Gate Array (FPGA), a Memory Management Unit (MMU), hard-wired logic, analog circuitry and/or a combination thereof. In some implementations, processor circuitry 104 can include a System on a Chip (SoC). In this regard, those of ordinary skill in the art will appreciate that processor circuitry 104, main memory 106, and/or DSD interface 102 may be combined into a single component or casing in some implementations.

In the example of FIG. 1, processor circuitry 104 can access main memory 106 to execute instructions, such as instructions from an application 10 to encode and cache modifications made by another application 10 to a page stored in storage 116, as discussed in more detail below. One or more applications 10, or portions thereof, that are executed by processor circuitry 104 can be loaded into main memory 106. Main memory 106 serves as a byte-addressable memory for processor circuitry 104, and can include, for example, a volatile RAM such as DRAM or Static Random Access Memory (SRAM), a non-volatile RAM, or other solid-state memory, such as a Storage Class Memory (SCM) that can be written to at a byte-level, as opposed to at a larger page-level. SCM can include, for example, C-RAM, PCM, PMC-RAM, OUM, RRAM, FeRAM, MRAM, and/or 3D-XPoint memory.

In some embodiments, main memory 106 may also store cache 12A and mapping table 14A. In such embodiments, processor circuitry 104, such as an MMU of processor circuitry 104, can cache encoded updates or modifications in cache 12A for pages stored in storage 116. Mapping table 14A in such embodiments can include indications about which pages have encoded modifications cached in cache 12A and/or access information about an access frequency and/or access recency for cached data of pages stored in storage 116. In addition, mapping table 14A can be used to identify data requested by processor circuitry 104 that has been modified and cached in cache 12A, so that the modified version of the data (i.e., a currently valid version of the data) can be retrieved from cache 12A, instead of from storage 116, which stores an obsolete version of the data.

As discussed in more detail below, the encoding and caching of modifications to pages stored in storage 116 can reduce the amount of writes performed in storage 116 by accumulating modifications to the page in the cache and deferring the rewriting of the page. This reduces the write amplification caused by having to rewrite an entire page in storage 116 for a relatively small proportion of modified data. Such caching of encoded modifications can conserve the processing resources, the memory resources, and time required to rewrite pages. In addition, the overall reduction of write operations performed in storage media having a limited write endurance, such as NAND flash, can lengthen the usable life of the storage.

As noted above, an entire page 118 is rewritten for modifications made to data in the page because storage 116 is configured to write data in units of a page size, as opposed to smaller or more granular byte-addressable units that may be used by processor circuitry 104 when executing an application 10. In this regard, and as discussed in more detail below with reference to FIGS. 2 and 3, the encoding of modifications can be based on or suited to a line size of data that is between the byte-level and the page-level. In some implementations, the line size may correspond to a word size used by processor circuitry 104.

In the example of FIG. 1, DSD interface 102 allows host 101 to communicate with DSD 108 via a bus or interconnect. In some implementations, DSD interface 102 may communicate with host interface 110 of DSD 108 using a standard, such as Peripheral Component Interconnect express (PCIe), Ethernet, or Fibre Channel. In addition, processor circuitry 104 or DSD interface 102 may also use a logical interface for reading data from and writing data to DSD 108. In implementations where host 101 caches encoded modifications in cache 12A, host 101 may interface with DSD 108 using a storage device interface such as, for example, Non-Volatile Memory express (NVMe), that may be implemented, for example, by an OS driver executed by processor circuitry 104. Such block interfaces provide read and write commands to DSD 108 in page sizes that are larger than the byte-addressable sizes of the modifications made to the pages by processor circuitry 104.

In other embodiments where DSD 108, instead of host 101, encodes and caches modifications to pages 118, host 101 can interface with DSD 108 using a memory device interface, such as a PCIe Base Address Register (BAR) interface, Gen-Z, Open Coherent Accelerator Processor circuitry Interface (OpenCAPI), or Cache Coherent Interconnect for Accelerators (CCIX), that may be executed by processor circuitry 104. In some implementations, the memory device interface may be implemented by an MMU, or by other circuitry of processor circuitry 104, such as a hardware accelerator.

As shown in FIG. 1, DSD 108 includes host interface 110, controller circuitry 112, memory 114, and non-volatile storage 116. Host interface 110 allows DSD 108 to communicate with DSD interface 102 of host 101. Host interface 110, in some implementations, may communicate with DSD interface 102 of host 101 using a standard, such as PCIe, Ethernet, or Fibre Channel. In addition, DSD 108 may interface with host 101 using a logical interface such as NVMe using a larger page size or block size in implementations where encoded modifications for pages are cached at host 101, or a logical interface such as PCIe BAR where encoded modifications for pages are cached at DSD 108.

Controller circuitry 112 can include circuitry such as one or more processors for executing instructions and can include, for example, a CPU, a GPU, a microcontroller circuitry, a DSP, an ASIC, an FPGA, hard-wired logic, analog circuitry and/or a combination thereof. In some implementations, controller circuitry 112 can include an SoC such that one or both of host interface 110 and memory 114 may be combined in a single chip with controller circuitry 112.

Memory 114 of DSD 108 can include, for example, a volatile RAM such as DRAM, a non-volatile RAM, SCM, or other solid-state memory. Controller circuitry 112 can access memory 114 to execute instructions, such as firmware 16 that can include instructions for operating DSD 108. In addition, controller circuitry 112 may access memory 114 to cache data to be written in storage 116 and/or data read from storage 116 to be returned to host 101. In embodiments where encoded page modifications are cached in cache 12B of memory 114, as opposed to in main memory 106 of host 101, firmware 16 of DSD 108 can include instructions for encoding and caching modifications, as discussed in more detail below. In addition, controller circuitry 112 may access mapping table 14B in such embodiments to determine whether modifications for a page 118 stored in storage 116 are cached in cache 12B and/or access information, such as an access frequency or access recency, for pages with cached modifications. Mapping table 14B can also be used to identify data requested by host 101 that has been previously modified and cached in cache 12B, so that the modified version of the data (i.e., the valid data) can be retrieved from cache 12B, instead of from storage 116, which may store an obsolete version of the data.

Those of ordinary skill in the art will appreciate that other implementations can include more or less than the elements shown in FIG. 1, and that the processes disclosed herein may be implemented in other systems. For example, other systems may include multiple hosts accessing DSD 108, or a separate memory apart from memory 114 of DSD 108, or a separate memory apart from main memory 106 of host 101, for caching encoded modifications to pages 118 stored in storage 116.

Figure 2:
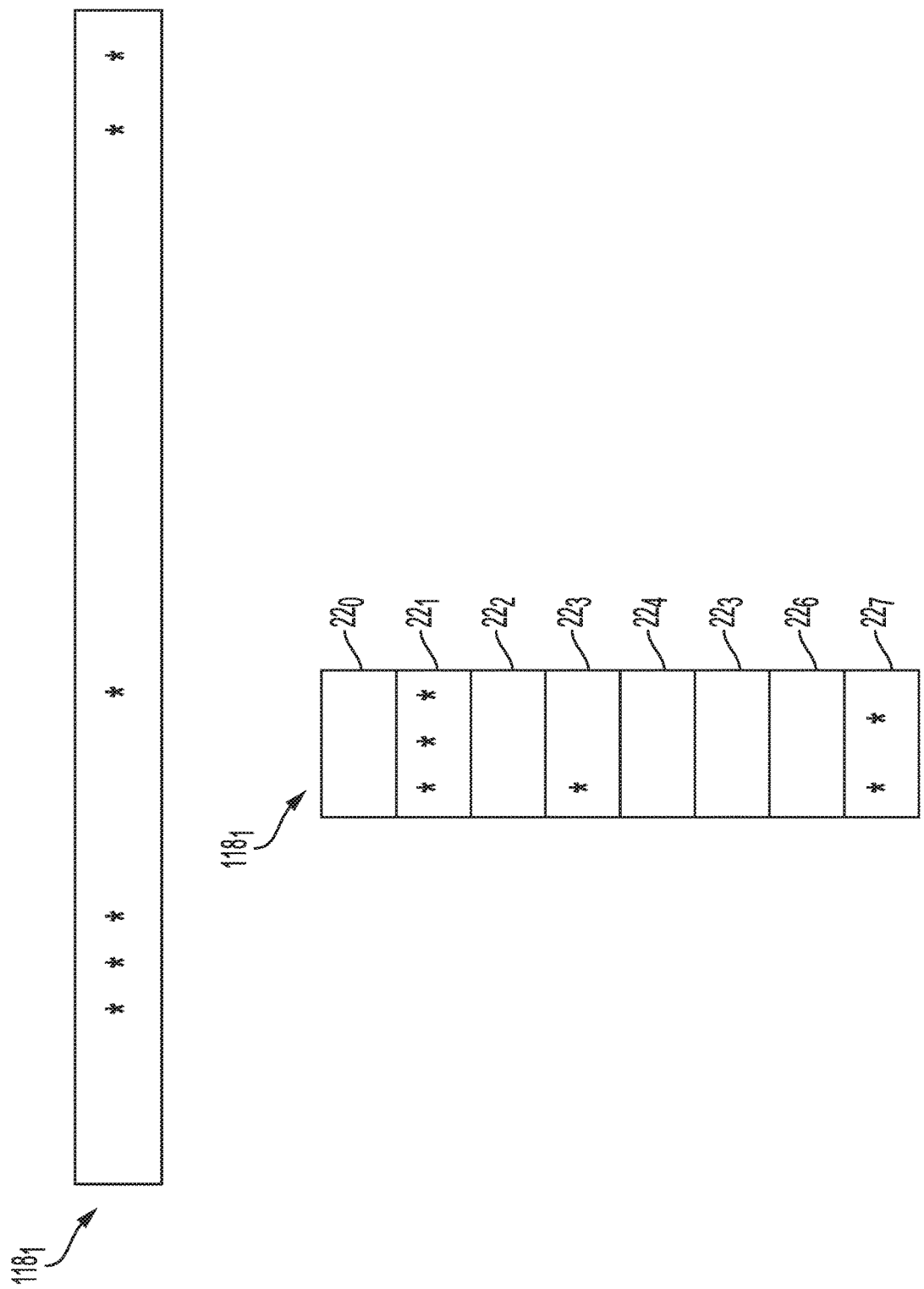
FIG. 2 illustrates an example of modifications made to a page and the distribution of the modifications among lines in the page according to one or more embodiments.

FIG. 2 illustrates an example of modifications made to page $118_1$ and the distribution of the modifications among lines 22 of page $118_1$ according to one or more embodiments. Page $118_1$ can include one of the pages 118 stored in storage 116 in FIG. 1, and can include a range of data starting at a beginning logical address (e.g., a Logical Block Address (LBA)) to an ending logical address that corresponds to a predetermined page size, such as 4 KB. In FIG. 2, modifications to data in page $118_1$ are made at various locations or positions in page $118_1$ that are indicated with asterisks.

The modifications in the example of FIG. 2 are generally clustered or localized at three locations in the page. Aspects of the present disclosure take advantage of the tendency of updates or modifications to pages to be concentrated or clustered in the page by identifying one or more lines in the page that include data to be modified. The lines can be defined as a predetermined size or unit of data within the page. In some implementations, the predetermined size of the lines corresponds to a word size of processor circuitry requesting the modifications to the page. The word size can be the amount of data processed by the processor circuitry at a given time, such as 32 bits (i.e., 4 bytes) or 64 bits (i.e., 8 bytes), for example.

In the bottom half of FIG. 2, page $118_1$ is divided into eight lines from line $22_0$ to line $22_7$. Lines 22 each have a predetermined size, such as 4 or 8 bytes, which would provide a total page size for page $118_1$ of 32 or 64 bytes for eight lines from $22_0$ to $22_7$. As will be appreciated by those of ordinary skill in the art, the predetermined size of the lines can vary in other implementations, and the number of lines shown FIG. 2 is for illustration purposes such that other implementations may include many more lines than the eight lines shown in FIG. 2. For example, page $118_1$ may include 4,096 bytes (i.e., a 4 KB page size) with 512 8B lines in some implementations.

In addition, the line size may also be adjusted in the field based on changes in modification patterns or trends. For example, modification information, such as statistics on the clustering of modifications in pages may lead to an adjustment to a larger or smaller line size. In another example, different hosts may be associated with different line sizes, such that modification requests from a first host accessing DSD 108 result in a line size of 4 bytes, while modification requests from a second host result in a line size of 8 bytes.

As shown in FIG. 2, three modifications are made to data in line $22_1$, one modification is made to data in line 223, and two modifications are made to data in line $22_7$. The size of each modification can be a fixed unit of data, such as one byte. As discussed in more detail below with reference to FIGS. 3 to 4E and FIG. 7, an encoding scheme can be selected for encoding the modifications to pages based on the degree of clustering of modifications within lines of one or more pages. Each encoding scheme may be associated with a different storage cost in terms of the storage space consumed in a cache (e.g., cache 12A or cache 12B in FIG. 1). The selected encoding scheme may be reevaluated periodically, such as, for example, after a predetermined amount of time, a predetermined number of modifications, or a predetermined number of pages rewritten in the storage, to select a different encoding scheme if a lower storage cost is determined for the different encoding scheme. This can allow for the encoding of modifications to adjust to different workloads or changing modification patterns caused by, for example, different applications 10 being executed at different times, or by different hosts accessing pages stored in the DSD.

In some implementations, a number of lines with modifications in a page may need to be below a threshold number of lines before encoding and caching the modifications. If the threshold number of lines with modifications is reached, it may then be more efficient in terms of processing and memory resources to rewrite the page with the modifications without encoding and caching the modifications. On the other hand, if the threshold number of modified lines is not reached in such implementations, the modifications to the page may be considered sparse enough to accumulate encoded modifications for the page over time in a cache to defer rewriting the page. Such deferring of page rewrites can reduce the inefficiencies caused by write amplification, and prolong the usable life of the storage in cases where the storage has a limited write endurance.

Figure 3:
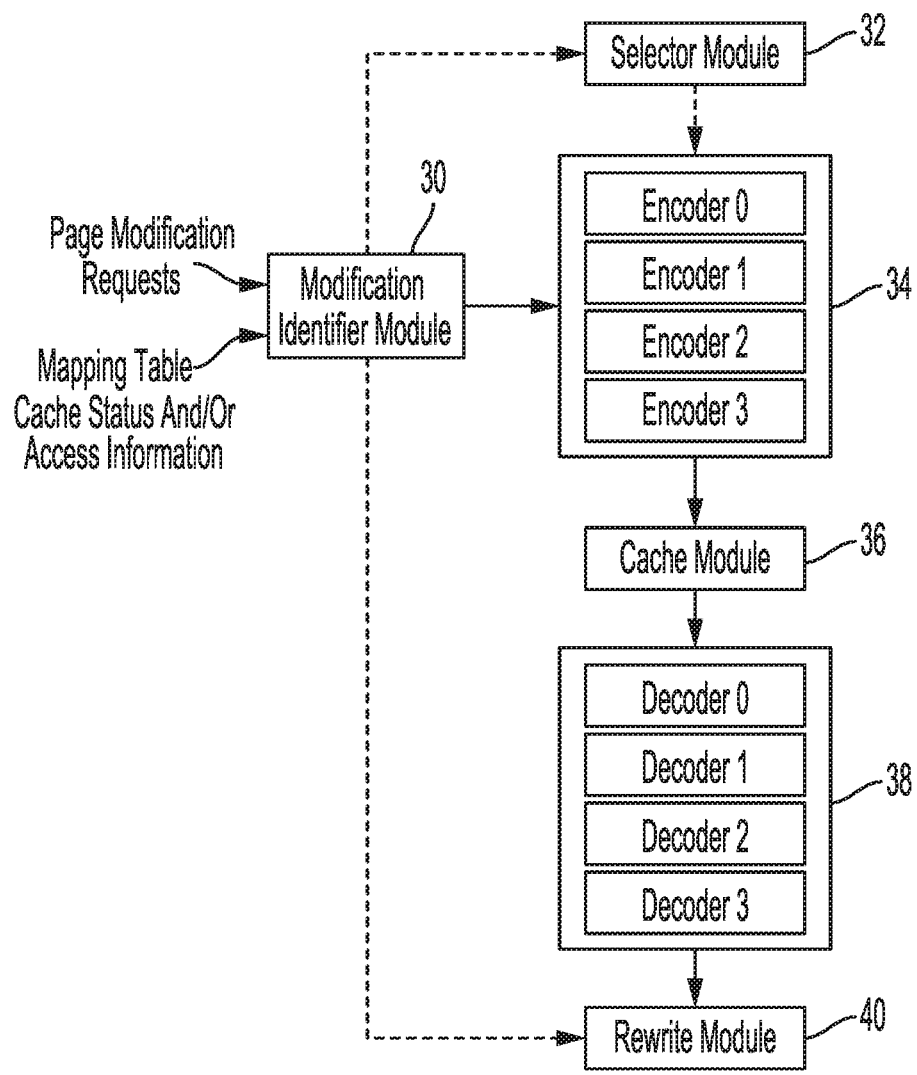
FIG. 3 is an example of a system environment for modifying pages according to one or more embodiments.

FIG. 3 is an example of a system environment for modifying pages according to one or more embodiments. The modules shown in the example of FIG. 3 may be implemented by, for example, processor circuitry 104 of host 101 or by controller circuitry 112 of DSD 108 in FIG. 1.

As shown in FIG. 3, modification identifier module 30 receives requests to modify pages stored in a non-volatile storage. Modification identifier module 30 may then access a mapping table (e.g., mapping table 14A or 14B in FIG. 1) to determine a cache status of the page and/or access information for the page. The mapping table can indicate a cache status of whether a page has modifications that have already been cached in the cache. In some implementations, the mapping table can include logical addresses (e.g., LBAs) for the pages that have modifications cached in the cache, a flag, or other identifier for pages that have modifications cached in the cache.

Modification identifier module 30 may alternatively or additionally access the mapping table in some implementations to determine access information for a page. The access information may indicate how recently a previous request to read or write data to the page occurred, and/or or a number of previous reads or writes to the page within a period of time. Modification identifier module 30 may use the cache status and/or the access information for a page when receiving modification requests to determine whether to encode and cache the requested modifications or to rewrite the page without encoding and caching the requested modifications for the page.

The requests to modify a page can include, for example, byte addresses for the data to be modified and the new data for the modification. Modification identifier module 30 can identify the page using a mapping table (e.g., mapping table 14A or 14B in FIG. 1), and one or more lines in the page corresponding to the byte addresses for the modifications. Modification identifier 30 may also pass line positions indicating locations of the identified lines in the page to encoding module 34 if the modifications are to be cached, or may pass the line positions or byte addresses for the identified page to rewrite module 40 if the page is to be rewritten without caching the modifications.

In some implementations, modification identifier module 30 may also provide encoding module 34 with one or more intra-line positions for each identified line indicating one or more locations for the modifications to be made in the line. In addition, modification identifier module 30 may pass the new data for the modifications to encoding module 34 to create encoded data for the modifications. In other implementations, each of the line identification, the intra-line identification, and passing of new data for making the modifications may be handled by a separate module instead of by a single modification identifier module as shown in the example of FIG. 3.

Encoding module 34 creates encoded data for the modifications, such as by encoding the line positions, intra-line positions, and new data using one of a plurality of different encoders, such as encoders 0, 1, 2, and 3 in the example of FIG. 3. Each encoder uses a different encoding scheme to encode the new data for the modifications and the associated location information for the modifications. For example, some encoding schemes may use the byte addresses for the modifications to encode the modifications as a delta list of modifications to be made to the page without taking into consideration line positions or intra-line positions for the modifications. Such an encoding scheme may be used by encoder 0 for modification patterns that are considered to have low degree of clustering within one or more pages. An example of such an encoding scheme is discussed in more detail below with reference to FIG. 4B.

Other encoding schemes, such as those used by encoders 1, 2, and 3 in FIG. 3 can be line-aware to take advantage of the clustering of modifications within lines, and to further reduce a storage cost for caching the modifications. Examples of such line-aware encoding schemes are discussed in more detail below with reference to FIGS. 4C, 4D, and 4E. Within the line-aware encoding schemes, some encoding schemes, such as those used by encoders 1 and 2 in FIG. 3, can use a hierarchal line encoding that forms a tuple for each modified line including the line position, the intra-line position or positions of the modifications in the line, and the new data for making the modifications in the line. Examples of such hierarchal line encoding are discussed in more detail below with reference to FIGS. 4C and 4D.

Another type of line-aware encoding can be performed by encoder 3 in FIG. 3 to map the modifications to a page and perform entropy encoding, such as Huffman encoding or arithmetic encoding, on one or more bit sequences derived from the modification mapping and the associated new data. An example of such modification mapping and entropy encoding is discussed in more detail below with reference to FIG. 4E.

In the example of FIG. 3, the encoder or encoding scheme used to create encoded data for the modifications and the location information associated with the modifications is selected by selector module 32 based on storage costs determined for using different encoding schemes for one or more pages and/or collected modification information that may indicate a degree of clustering of modifications. As discussed in more detail below with reference to FIGS. 4A to 4E, the determined storage costs can relate to a degree of clustering of modifications within the lines identified by modification identifier 30. Different encoding schemes can have different storage costs relative to each other in terms of the amount of storage consumed in the cache depending on the level or degree that modifications are clustered in the contiguous byte ranges forming the identified lines.

As discussed in more detail below with reference to FIG. 7, selector module 32 can periodically determine storage costs for one or more pages that receive one or more page modification requests at modification identifier module 30, as indicated by the dashed line from modification identifier module 30 and selector module 32. The sampling of modification requests may occur, for example, after a predetermined period of time since a previous selection of an encoding scheme, after a predetermined number or modification requests, and/or after a predetermined number of pages have been rewritten in the storage of the DSD. In some implementations, modification identifier module 30 may provide a copy of the information provided to encoder module 34 for encoding using the currently selected encoding scheme. The other encoders of encoder module 34 may then encode the same modifications and associated location information for selector module 32 to compare storage costs for the different encoding schemes. In some implementations, modification requests for multiple pages may be used to determine average storage costs for each of the different encoding schemes for comparison. In other implementations, the storage costs for modifications to a single page may be compared. Selector module 32 may then select the encoding scheme or encoder that results in the lowest storage cost for the modifications for the one or more pages.

As discussed in more detail below with reference to FIG. 8, selector module 32 may additionally or alternatively select an encoding scheme based on modification information that may be collected by modification identifier module 30. Such modification information may include, for example, statistics such as an average number of modifications for each modified line divided by the number of modifications being made to a page. In another example, the collected information can include the number of modifications made within different byte ranges of each other, such as the number of modifications made within 4 bytes, 8 bytes, and 16 bytes of another modification. The number of modifications made within these different byte ranges may then be divided by the number of modifications for a page to determine a degree of clustering for the modifications using the different sized byte ranges. Such different sized byte ranges may correspond to different possible line sizes that could be used for encoding modifications.

Selector module 32 may then select an encoding scheme based on a threshold value for the collected modification information, such that the collected modification information (e.g., an average number of modifications per modified line) is within a threshold for a particular encoding scheme. For example, encoding scheme 1 may be associated with a threshold of an average of 1.1 modifications per modified line, and encoding scheme 2 may be associated with a threshold of an average of 1.3 modifications per modified line. In such an example, selector module 32 can select encoding scheme 2 when the collected modification information indicates an average number of modifications per modified line of 1.2. In another example, selector module 32 may select an encoding scheme by changing the line size used for encoding to better suit the degree of clustering indicated by the collected modification information.

The encoded modifications and location information for the selected encoding scheme are cached by caching module 36 in a cache that is managed by caching module 36. In this regard, caching module 36 can implement caching policies for the cache, such as determining when to flush data from the cache and/or which data to flush from the cache. In some implementations, cache module 36 may determine that a remaining available storage space or the amount of cached data has reached a storage threshold for flushing data from the cache.

In addition, or alternatively, cache module 36 may determine that an access threshold, such as a write frequency and/or a read frequency, for a particular page that has modifications stored in the cache has fallen below a threshold access frequency. In such implementations, cache module 36 may then flush the modifications for less frequently read and/or less frequently written pages from the cache to make room for caching modifications for more frequently read and/or more frequently written pages. Caching data for more frequently read and/or more frequently written pages may provide a performance benefit in some implementations, since it may be quicker to access such data from the cache than from the non-volatile storage (e.g., storage 116 in FIG. 1).

The access threshold may also include, or may alternatively include, how recently data for the page has been accessed, so that encoded data for pages that have been more recently accessed (e.g., written to and/or read from within a predetermined period of time) are kept in the cache longer than encoded data for pages that have less recently been accessed. In this regard, updates or modifications for pages can be accumulated in the cache before flushing the updates or modifications for the page to be rewritten in the storage.

Cache module 36 may access a mapping table (e.g., mapping table 14A or mapping table 14B in FIG. 1) to determine access information for a page that has modified data in the cache. Cache module 36 in some implementations may also update the access information in the mapping table, such as to increment a modification count or an overall access count for a page, for example. In some implementations, cache module 36 may also access the mapping table to determine whether modifications to be cached should overwrite previously cached modifications for the page.

Decoder module 38 decodes the data flushed from the cache for rewriting the corresponding page with the new data in storage 116. In addition, decoder module 38 may be used for decoding modified data that has been requested by processor circuitry of a host. As shown in FIG. 3, decoder module 38 includes decoders 0 to 3 corresponding to respective encoders 0 to 3 for decoding the encoded data based on the encoding scheme used to encode the data. In some implementations, the encoded data may include an indication of the encoding scheme used to encode the data, such as with a first value for the encoded data. In other implementations, a mapping table (e.g., mapping table 14A or 14B in FIG. 1) may indicate the encoding scheme used to encode the data.

Rewrite module 40 performs read-modify-write operations for storage of modified pages in the storage of the DSD. In embodiments where the processor circuitry of the host (e.g., processor circuitry 104 in FIG. 1) performs the encoding and caching for page modifications, the processor circuitry can use rewrite module 40 to request the old page stored in the storage of the DSD, and update the page in the host's main memory (e.g., main memory 106 in FIG. 1) with the decoded modified data before sending a write command to the DSD using a block interface to write the new page with the modified data to replace the obsolete version of the page in the storage. In embodiments where the controller circuitry of the DSD (e.g., controller circuitry 112 in FIG. 1) performs the encoding and caching for page modifications, the controller circuitry can use rewrite module 40 to request the old page stored in the storage of the DSD, and update the page in a memory of the DSD (e.g., memory 114 in FIG. 1) with the decoded modified data before writing the new page with the modified data to replace the obsolete version of the page in the storage.

Those of ordinary skill in the art will appreciate that other implementations may include a different system environment than shown in FIG. 1. For example, other implementations, may include different modules, such as separate line identifier and intra-line identifier modules in place of modification identifier module 30, or a combined encoding and decoding module in place of encoding module 34 and decoding module 38.

Figure 4A:
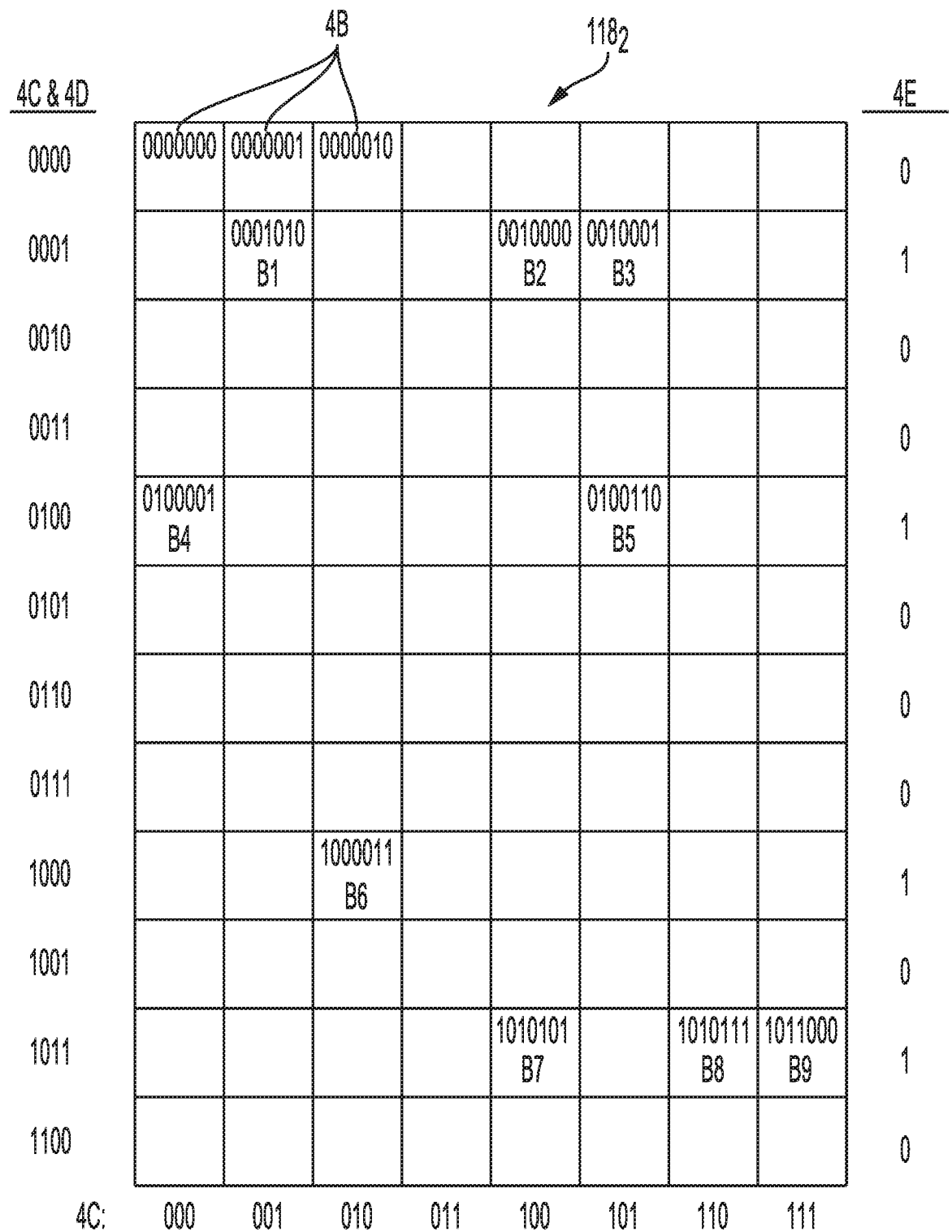
FIG. 4A illustrates modifications for a page according to one or more embodiments.

FIG. 4A illustrates modifications for page $118_2$ according to one or more embodiments. As shown in FIG. 4A, page $118_2$ is to be modified with new data B1 to B9 at various locations throughout page $118_2$. In the example of FIG. 4A, page $118_2$ has been divided into twelve lines shown as rows in FIG. 4A. Each line includes eight positions, with each position shown as a separate box in FIG. 4A. Each position in the example of FIG. 4A represents one byte of data, such that page $118_2$ has a page size of 96 bytes. Those of ordinary skill in the art will appreciate that this page size is only for purposes of illustration, and that page sizes in practice will generally be much larger than page $118_2$ in FIG. 4A, such as for pages including, for example, 4,096 bytes that are logically divided into 512 lines of eight bytes.

As shown in FIG. 4A, modifications are to be made to data in four out of the twelve lines of page $118_2$. As noted above, the tendency of applications to make localized or clustered modifications within a page can allow for improved encoding or compression based on the degree of clustering of the modification locations in the page. The new data B1 to B9 represent data that is to replace data currently stored in page $118_2$ in a storage of a DSD (e.g., storage 116 in FIG. 1). FIGS. 4B to 4E discussed below describe different example encoding schemes that have different storage costs for caching the modifications and the associated location information for the modifications in a cache. The references in FIG. 4A to "4B", "4C", "4D", and "4E" refer to encoding used to identify positions of modifications in page $118_2$, and are discussed in more detail below.

FIG. 4B illustrates a first example encoding scheme referred to herein as a delta list encoding scheme for creating encoded data for the modifications shown in FIG. 4A according to one or more embodiments. The delta list encoding scheme of FIG. 4B may be performed by, for example, encoder 0 in FIG. 3 discussed above.

In the example of FIG. 4B, the modifications and the associated location information are encoded as a list of nine tuples, with each tuple including a location in page $118_2$ for the modification, and the new data for the modification (e.g., B1 for the first modification). As shown at the top portion of boxes in FIG. 4A, each box (i.e., each byte or unit in page $118_2$) has a seven bit sequence indicating the position of the byte or unit in page $118_2$. For example, the location for modification B1 occurs at a location represented by 0001010. In FIG. 4B, the first tuple for the first modification includes the page location of 0001010 and data for B1. Similarly, B2 to B9 each have their own tuple in the list including the seven bit location for the modification, and the data for the modification. Those of ordinary skill in the art will appreciate with reference to the present disclosure that the number of bits needed to uniquely represent the location of each modification will depend on the size of the page (e.g., a 4 KB page size) and a unit size for each modification (e.g., a 1 byte modification size).

The storage cost for a delta list encoding scheme such as the encoding scheme described with reference to FIG. 4B depends on the number of modifications made to the page, the size of the units or modifications, and the number of bits needed to represent each position in the page for a given page size and unit size. A storage cost, $S_0$, for the delta list encoding can be represented in terms of the number of modifications (m), the size of the page (pagesize), and the size of the units (unitsize), as shown in Equation 1 below.

$$S_0 = m\left(\log_2 \frac{pagesize}{unitsize} + unitsize\right) \quad \text{Equation 1}$$

For example, a 4 KB page size would have a pagesize of 32,768 bits (i.e., 4,096 bytes multiplied by 8 bits), and a 1 byte unit size would have a unitsize of 8 bits. With these example values for pagesize and unitsize, the storage cost $S_0$ is m(12+8) bits, or 20m bits. The $\log_2$ portion of the factor of m (i.e., 12) is the number of bits needed to represent each location in the page for the given page size and unit size, and the remaining portion of the factor of m (i.e., 8) is the number of bits needed to represent the modified data (e.g., B1). As compared to rewriting an entire page, there is a storage savings for using the delta list encoding scheme if the number of modifications, m, is less than $$\frac{pagesize}{unitsize + \log_2 \frac{pagesize}{unitsize}},$$

where pagesize and unitsize are expressed in bits. For the example of a 4 KB page size and 1 byte modification unit size, there is a storage savings if m, the number of modifications in a page, is less than 1,638 modifications.

After encoding, the encoded modifications and location information can be cached (e.g., in cache 12A or cache 12B in FIG. 1), and a mapping table (e.g., mapping table 14A or mapping table 14B) can be updated to indicate that modified data for page $118_2$ is in the cache. As described in more detail below with reference to the page rewriting process of FIG. 6, a decoder for delta list encoding, such as decoder 0 in FIG. 3, can decode the encoded modifications for rewriting page $118_2$ in a storage (e.g., storage 116 in FIG. 1) including the modifications (i.e., B1 to B9). As noted above, the cached data for the modifications or the mapping table can include an indication of which encoding scheme was used to encode the data so that the correct decoder is used.

FIG. 4C illustrates a second example encoding scheme referred to herein as an intra-line list encoding scheme for creating encoded data for the modifications shown in FIG. 4A according to one or more embodiments. The intra-line list encoding scheme of FIG. 4C may be performed by, for example, encoder 1 in FIG. 3 discussed above. The intra-line list encoding scheme of FIG. 4C differs from the delta list encoding scheme of FIG. 4B in that the intra-line list encoding scheme is line-aware by using a hierarchal encoding based on the logical divisions of page $118_2$ into lines of contiguous byte ranges.

As shown in FIG. 4A, each row or line in page $118_2$ is assigned a binary line position under the reference for "4C & 4D" on the left of page $118_2$ from 0000 for the first line at the top of page $118_2$ to 1100 for the twelfth line at the bottom of page $118_2$. As noted above, line-aware encoding can take advantage of processing patterns that tend to make modifications to data within a logical proximity of other modifications (i.e., clustered modifications). In the example of FIG. 4C, only four of the twelve lines in page $118_2$ are to be modified. The other eight lines therefore do not need encoding in the example encoding of FIG. 4C.

Each of the four modified lines is represented in the encoding with its binary line position (e.g., 0001 for the first modified line). A list of one or more tuples then follow the line position, with each tuple including an intra-line position for a modification in the line, and the modified data. For example, the first modified line identified by the line position 0001 includes three tuples for modifications to be made for B1, B2, and B3. Since there are 8 bytes per line in the example of page $118_2$ in FIG. 4A, three bits are used to represent an intra-line position for each modification. The first modification of B1 in the first modified line in FIG. 4A has an intra-line position of 001. The second modification of B2 in the first modified line has an intra-line position of 100. The third modification of B3 in the first modified line has an intra-line position of 101.

In the example of FIG. 4C, modifications after the first modification for a line include a new intra-line unit indicator to denote that there is another modification in the same line. For example, a 0 precedes the intra-line positions for B2 and B3 to indicate a new modification in the same line so that the line position of 0001 is only provided once for all three modifications of B1, B2, and B3 in the first modified line.

The line position for the second modified line, and the line positions for all modified lines after the first modified line, is preceded by a 1 to indicate a new line. For example, a 1 precedes the line position of 0100 for the second modified line to indicate a new modified line after the first modified line. The first modified line does not need a new line identifier in the example of FIG. 4C.

The storage cost for an intra-line list encoding scheme, such as the encoding scheme described with reference to FIG. 4C, depends on the number of modifications made to the page, the size of the units or modifications, the number of bits needed to represent the position of each line in the page for a given page size and line size, and the number of bits needed to represent each intra-line position for a given line size and unit size. A storage cost, $S_1$, for the intra-line list encoding can be represented in terms of the number of modifications (m), the size of the page (pagesize), the size of the lines (linesize), the size of the units (unitsize), and the number of modified lines (M), as shown in Equation 2 below.

$$S_1 = \left(\left(1 + \log_2 \frac{pagesize}{linesize}\right)M - 1\right) + \left(\log_2 \frac{pagesize}{unitsize}\right)M + \left(1 + \log_2 \frac{linesize}{unitsize}\right)(m - M) + unitsize(m)$$

Equation 2

For example, a 4 KB page size would have a pagesize of 32,768 bits, an 8 byte line size would have a linesize of 64 bits, and a 1 byte unit size would have a unitsize of 8 bits. With these example values for pagesize, linesize, and unitsize, the storage cost $S_1$ is (1+9)M−1+(3)M+(1+3)(m−M)+8m, which reduces to 9M+12m−1.

The first addend in Equation 2 above represents the storage cost in bits for encoding the line positions of each modified line, with the number of bits needed to uniquely represent each line based on the pagesize and linesize, and an additional bit to indicate each modified line after the first modified line (e.g., the 1 preceding each modified line's position after the first modified line in FIG. 4C). An extra bit is subtracted out for the first modified line, which does not need a new line indicator, as in the example of FIG. 4C. The second addend in Equation 2 represents the storage cost in bits of the first modification made in each modified line, and the third addend represents the storage cost of each modification made in each modified line after the first modification. The last addend represents the storage cost of the modified data (e.g., the storage cost for B1 to B9), which is the same as in the delta list encoding example of FIG. 4B.

As noted above, different encoding schemes will provide for more compression depending on the degree of clustering of the modifications. In the case of the delta encoding scheme of FIG. 4B discussed above, the amount of compression depends only on the number modifications made. In the case of the intra-line list encoding scheme of FIG. 4C, the amount of compression depends on both the number of modifications made and the number of modified lines. When the number of modifications, m, is much greater than the number of modified lines, M, meaning there is a high degree of clustering of modifications within lines, the intra-line list encoding scheme will provide more compression than the delta list encoding scheme. On the other hand, when there is a minimal degree of clustering, such that m=M, the intra-line list encoding scheme provides less compression than the delta encoding scheme for pages with more than one modification. Using the examples for pagesize, linesize, and unitsize given above, the storage cost $S_0$ for the delta list encoding scheme remains 20m when m=M, while the storage cost $S_1$ for the intra-line list encoding scheme reduces to 21m−1 when m=M.

After encoding, the encoded data can be cached, and a mapping table can be updated to indicate that modified data for page $118_2$ is cached in the cache. As described in more detail below with reference to the page rewriting process of FIG. 6, a decoder for intra-line list encoding, such as decoder 1 in FIG. 3, can decode the encoded modifications for rewriting page $118_2$ in a storage including the modifications (i.e., B1 to B9). As noted above, the cached data for the modifications or the mapping table can include an indication of which encoding scheme was used to encode the data so that the correct decoder is used.

FIG. 4D illustrates a third example encoding scheme referred to herein as an intra-line bitmap encoding scheme for creating encoded data for the modifications shown in FIG. 4A according to one or more embodiments. The intra-line bitmap encoding scheme of FIG. 4D may be performed by, for example, encoder 2 in FIG. 3 discussed above. Like the intra-line list encoding scheme of FIG. 4C, the intra-line bitmap encoding scheme of FIG. 4D is line-aware by using a hierarchal encoding based on the logical divisions of page $118_2$ in FIG. 4A into lines of contiguous byte ranges. However, the intra-line bitmap encoding scheme of FIG. 4D differs from the intra-line list encoding scheme of FIG. 4C in that the intra-line bitmap encoding scheme uses a line modification bitmap for each modified line instead of a separate position for each modification.

As discussed above for the intra-line list encoding scheme of FIG. 4C, each line in page $118_2$ is assigned a binary line position shown in FIG. 4A under the reference for "4C & 4D" on the left of page $118_2$. The line positions begin with 0000 for the first line at the top of page $118_2$ to 1100 for the twelfth line at the bottom of page $118_2$. As noted above, line-aware encoding can take advantage of processing patterns that tend to make modifications to data within a logical proximity of other modifications (i.e., clustered modifications). In the example of FIG. 4D, only four of the twelve lines in page $118_2$ are to be modified. The other eight lines therefore do not need encoding in the example of FIG. 4D.

As with the intra-line list encoding of FIG. 4C, each of the four modified lines is represented in the encoding scheme of FIG. 4D with its binary line position (e.g., 0001 for the first modified line). Unlike the intra-line list encoding, a bitmap representing each unit in the modified line follows the line position in FIG. 4D to provide intra-line positions for the modifications. In the example of FIG. 4D, a value of 1 in the bitmap indicates the position of a modification in the line, and a value of 0 in the bitmap indicates no change for the corresponding position in the line. For example, the line modification bitmap for the first modified line in the example encoding of FIG. 4D indicates modifications at the second, fifth, and sixth locations in the line with the bitmap [01001100]. The data for the modified positions then follows the bitmap with B1, B2, and B3.

Although each modified line in the intra-line bitmap encoding requires a bitmap including a number of bits equal to the number of units in a line (e.g., eight bits for the eight units per line in FIG. 4A), greater compression can typically be achieved when there is a greater degree of clustering of modifications within lines than when using intra-line list encoding because each modification does not need a separate intra-line position or additional boundary encoding, such as extra bits to indicate new modifications within the same line or an extra bit to indicate the start of a new line.

The storage cost for an intra-line bitmap encoding scheme such as the encoding scheme described with reference to FIG. 4D depends on the number of modifications made to the page, the size of the units or modifications, the number of bits needed to represent the position of each line in the page for a given page size and line size, and the number of bits needed in a bitmap for a given line size and unit size. A storage cost, $S_2$, for the intra-line bitmap encoding can be represented in terms of the number of modifications (m), the size of the page (pagesize), the size of the lines (linesize), the size of each unit (unitsize), and the number of modified lines (M), as shown in Equation 2 below.

$$S_2 = \left(\left(\log_2 \frac{pagesize}{linesize}\right) + \frac{linesize}{unitsize}\right)M + unitsize(m) \quad \text{Equation 3}$$

For example, a 4 KB page size would have a pagesize of 32,768 bits, an 8 byte line size would have a linesize of 64 bits, and a 1 byte unit size would have a unitsize of 8 bits. With these example values for pagesize, linesize, and unitsize, the storage cost $S_2$ is (9+8)M+8m, which reduces to 17M+8m.

The first addend in Equation 3 above (i.e., the loge portion) represents the storage cost in bits for encoding the line positions of each modified line, with the number of bits needed to uniquely represent each line based on the pagesize and linesize. The second addend in Equation 3 (e.g., (linesize/unitsize)×M) represents the storage cost in bits of the intra-line modification bitmap. The last addend represents the storage cost of the modified data (e.g., B1), which is the same as in the delta list and intra-line list encoding examples discussed above.

As noted above, different encoding schemes will provide for better compression depending on the degree of clustering of the modifications. As compared to the intra-line list encoding for FIG. 4C discussed above, the amount of compression for the intra-line bitmap encoding of FIG. 4D is typically greater when there is more clustering of modifications in lines, but less when there is a minimal degree of clustering. When there is a minimal degree of clustering (i.e., m=M), and using the examples for pagesize, linesize, and unitsize given above, the storage cost $S_1$ for the intra-line list encoding scheme is 21m−1, while the storage cost $S_2$ for the intra-line bitmap encoding scheme is 25m.

After encoding, the encoded data can be cached, and a mapping table can be updated to indicate that modified data for page $118_2$ is cached in the cache. As described in more detail below with reference to the page rewriting process of FIG. 6, a decoder for intra-line bitmap encoding, such as decoder 2 in FIG. 3, can decode the encoded modifications for rewriting page $118_2$ in the storage including the modifications (i.e., B1 to B9). As noted above, the cached data for the modifications or the mapping table can include an indication of which encoding scheme was used to encode the data so that the correct decoder is used.

Figure 4E:
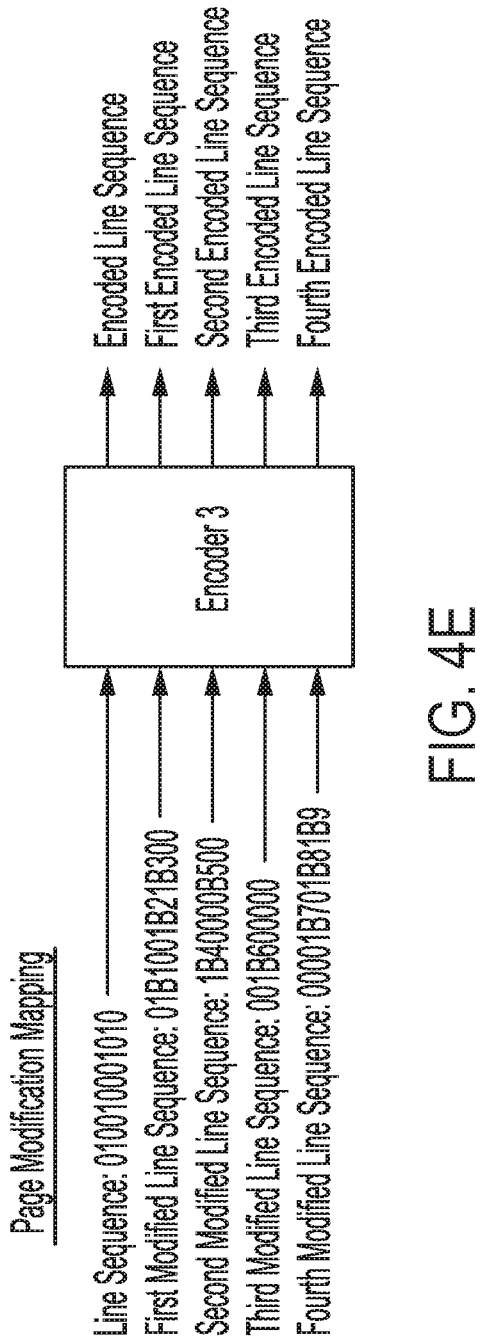
FIG. 4E illustrates a fourth example encoding scheme for creating encoded data for the modifications shown in FIG. 4A according to one or more embodiments.

FIG. 4E illustrates a fourth example encoding scheme referred to herein as a modification mapping entropy encoding scheme for creating encoded data for the modifications shown in FIG. 4A according to one or more embodiments. The encoding scheme of FIG. 4E may be performed by, for example, encoder 3 in FIG. 3 discussed above. Like the intra-line list and intra-line bitmap encoding schemes discussed above, the modification mapping entropy encoding scheme of FIG. 4E is line-aware by using the logical divisions of page $118_2$ of FIG. 4A into lines of contiguous byte ranges. However, the encoding scheme of FIG. 4E differs from the intra-line list and intra-line bitmap encoding schemes discussed above in that the modification mapping of FIG. 4E generates a bit sequence mapping the lines that have been modified and the lines that have not been modified in the page, before entropy encoding the bit sequence for the line modifications with bit sequences for each modified line.

As shown in FIG. 4A under "4E", each line in page $118_2$ is assigned either a 1 or a 0 on the right side of page $118_2$ to indicate whether the line is to be modified. As noted above, line-aware encoding can take advantage of processing patterns that tend to make modifications to data within a proximity of other modifications (i.e., clustered modifications).

In the example of FIG. 4E, the locations of the modified lines in the page (i.e., the line positions) are encoded with a bitmap. Each line that has a modification has a 1 value, while each line that is not modified has a 0 value. This bitmap is fed as a bit sequence into encoder 3 in FIG. 4E to produce an encoded line sequence. Encoder 3 can use an entropy encoding, such as Huffman encoding or arithmetic encoding, for example.

The modifications in each modified line are mapped into a modified line bit sequence that includes the intra-line positions for the modifications. For example, the first modified line sequence indicates a value of 0 for the first unit in the first modified line to indicate no modification to the first unit, but a value of 1 for the second unit to indicate a modification at the second unit, as shown in FIGS. 4A and 4E. After the indication of a modification in the first modified line sequence, the data for the modification follows with B1. The next modification in the first modified line is indicated after two 0 values for no changes at the third and fourth units, before a value of 1 indicating a modification at the fifth unit in the line. The data for the second modification at the fifth unit follows with the new data for the second modification, B2. A value of 1 follows B2 in the modified line sequence to indicate a third modification at the sixth unit in the line, which is followed by the new data for the modification, B3.

The line sequence indicating which lines have been modified in the page, and each of the four modified line sequences are input into encoder 3, which performs entropy encoding, such as Huffman encoding or arithmetic encoding. In implementations where encoder 3 performs arithmetic encoding, encoder 3 uses a line distribution of modified lines to other lines in page $118_2$ to encode the line sequence. In the example of FIG. 4E, the line distribution is ⅓, since four out of the twelve lines have been modified. The encoded line sequence generated by encoder 3 further compresses the line sequence to take up less space in the cache. Each of the four modified line sequences are also encoded by encoder 3 using a respective intra-line distribution for encoding the intra-line modification position or positions and the associated new data (e.g., B1, B2, and B3 for the first modified line).

As will be appreciated by those of ordinary skill in the art with reference to the present disclosure, the sequences encoded by encoder 3 can be encoded as separate streams or as one stream fed to encoder 3. In this regard, the line sequence and the modified line sequences in some implementations can be arranged as a single sequence. For example, the line sequence in FIG. 4E can be interleaved with the modified line sequences to form the sequence: 0101B1001B2163000011B400001B5000001001B600000 0100001B701B81B90, with the underlined portions in the sequence taken from the line sequence, and the portions following each "1" in the underlined portions of the line sequence being the modified line sequences corresponding to the underlined "1."

In implementations where Huffman encoding is used by encoder 3, a dictionary may be stored in a memory (e.g., main memory 106 or memory 114 in FIG. 1) to replace portions of the sequence input into the encoder with varying length sequences based on the frequency that the portion of the sequence appears in the sequence. Arithmetic encoding, on the other hand, does not need to store a dictionary, and can usually provide more compression for longer sequences than Huffman encoding.

The storage cost for the pre-processing modification mapping before entropy encoding, such as for the bit sequences shown for the page modification mapping in FIG. 4E, depends on the number of modifications made to the page, the size of the units or modifications, and the number of lines in the page. A storage cost, S3, for the page modification mapping in FIG. 4E before entropy encoding can be represented in terms of the number of modifications (m), the size of the page (pagesize), the size of the lines (linesize), the size of each unit (unitsize), and the number of modified lines (M), as shown in Equation 4 below.

$$S_3 = \left(\frac{pagesize}{linesize}\right) + \frac{linesize}{unitsize}M + unitsize(m) \qquad \text{Equation 4}$$

For example, a 4 KB page size would have a pagesize of 32,768 bits, an 8 byte line size would have a linesize of 64 bits, and a 1 byte unit size would have a unitsize of 8 bits. With these example values for pagesize, linesize, and unitsize, the storage cost S3 is 512+8M+8m. This storage cost is typically further reduced by the entropy encoding performed by encoder 3 in the example of FIG. 4E.

The first addend in Equation 4 above represents the storage cost in bits for the line sequence as a bitmap including one bit for each line in the page. The second addend in Equation 4 represents the storage cost in bits for the modified line sequences as bitmaps. The last addend represents the storage cost of the modified data (e.g., B1 to B9), which is the same as in the encoding examples discussed above for FIGS. 4B to 4D.

After entropy encoding, the encoded modifications can be cached, and a mapping table can be updated to indicate that modified data for page $118_2$ is cached in the cache. As described in more detail below with reference to the page rewriting process of FIG. 6, a decoder for decoding the modification mapping encoding and entropy encoding of FIG. 4E, such as decoder 3 in FIG. 3, can decode the encoded modifications for rewriting page $118_2$ in the storage including the modifications (i.e., B1 to B9). As noted above, the cached data for the modifications or the mapping table can include an indication of which encoding scheme was used to encode the data so that the correct decoder is used.

As will be appreciated by those of ordinary skill in the art with reference to the present disclosure, any of the foregoing encoding schemes discussed above for the delta list encoding scheme of FIG. 4B, the intra-line list encoding scheme of FIG. 4C, or the intra-line bitmap encoding scheme of FIG. 4D can be modified to include further entropy encoding as in the encoding scheme of FIG. 4E. For example, the encoded sequence for FIG. 4D including the intra-line bitmaps can be further compressed or encoded using entropy encoding before storing the encoded modifications and associated location information in a cache. In this regard, those of ordinary skill in the art will appreciate with reference to the present disclosure that changes to the disclosed encoding schemes are possible, such as by combining different aspects of some or all of the example encoding schemes described above for FIGS. 4B to 4E.

Example Processes

Figure 5:
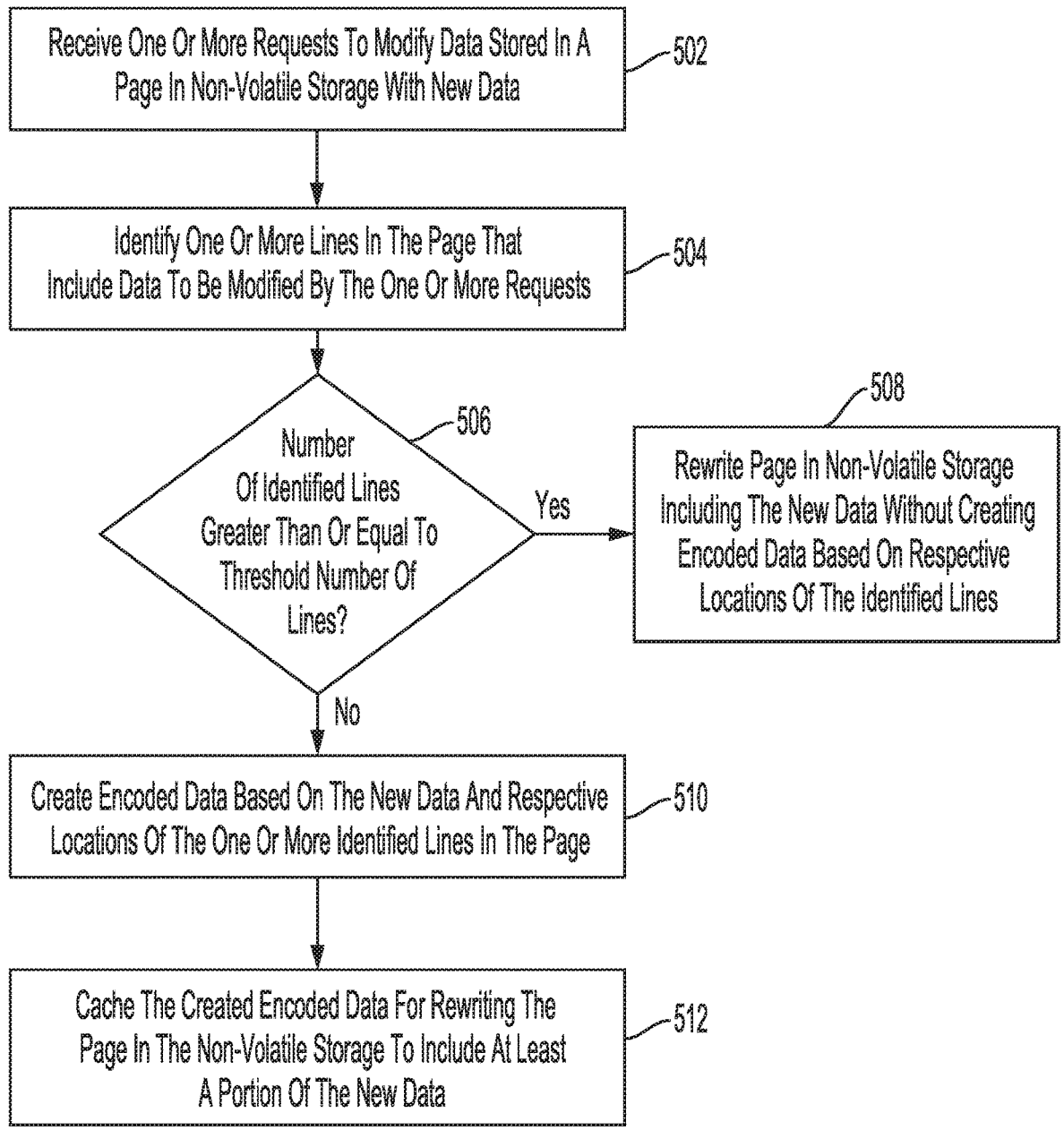
FIG. 5 is a flowchart for a line-aware modification caching process according to one or more embodiments.

FIG. 5 is a flowchart for a line-aware modification caching process according to one or more embodiments. The modification caching process of FIG. 5 may be performed, for example, by processor circuitry 104 or controller circuitry 112 in FIG. 1 executing modification identifier module 30, encoding module 34, and cache module 36 of FIG. 3.

In block 502, the circuitry (e.g., processor circuitry 104 or controller circuitry 112) receives one or more requests to modify data stored in a page (e.g., a page 118 in FIG. 1) in non-volatile storage (e.g., storage 116 in FIG. 1) with new data. The one or more requests may come from a processor executing an application that has modified or updated data for a page in its main memory (e.g., main memory 106 in FIG. 1). In embodiments where the caching and encoding of modifications is performed by a host's processor circuitry, a processor of the host's processor circuitry may execute an application that modifies the data, and stores the modified data in the host's main memory, which may serve as the request or requests to modify the data stored in the page in the non-volatile storage. In such embodiments, the host can use a block interface for communicating with the DSD including the storage when the page is ready to be rewritten with the new data.

In embodiments where the caching and encoding of modifications is performed by a DSD's controller circuitry, a processor of the host's processor circuitry may execute an application that modifies the data. The host may then use a memory interface to send the one or more requests to the DSD, which are received by the controller circuitry of the DSD as one or more page modification requests.

In block 504, the circuitry identifies one or more lines in the page that include data to be modified by the one or more requests. In some implementations, the identification of lines to be modified may be performed by executing a modification identifier module, such as modification identifier module 30 in FIG. 3. The lines can include logical divisions of the page into contiguous byte ranges of a predetermined size, such as 8 byte lines, for example. In some implementations, a line position identifier, as in the line-aware encoding schemes of FIGS. 4C and 4D, or a line bitmap, as in the modification mapping of FIG. 4E, may be used to identify the line position of the modified line or lines.

In addition, the line size may depend on recently collected modification information to better suit recent modification patterns that may result from a particular application or host. In other examples, the circuitry may associate the host requesting the modification with a particular line size, which may be based on previously collected modification information for requests sent by the host or information about the host's processor circuitry, such as a word size used by a processor of the host.

In block 506, the circuitry determines whether the number of lines identified in block 504 with modifications is greater than or equal to a threshold number of lines. In this regard, encoding and caching modifications for the page may not be efficient or worthwhile in terms of performance and/or storage space available in the cache if more than the threshold number of lines are to be modified in the page. In such cases, the circuitry in block 508 rewrites the page in the non-volatile storage including the new data without encoding at least the line positions and intra-line positions. In some cases, the modified data may still be temporarily cached as part of the normal page writing process without using a line-aware encoding scheme.

In some embodiments, the rewriting may be performed by processor circuitry of the host by requesting the page from the storage, modifying the page in the host's main memory to include the new data, and sending a write command to the DSD to write the modified page in place of the obsolete page in the storage. The host and DSD in such implementations may communicate using a block or storage device interface. In other embodiments, the rewriting may be performed by controller circuitry of the DSD by modifying the page in a memory of the DSD and rewriting the page with the new data in the storage. The host and DSD in such embodiments may communicate using a memory device interface.

If the number of identified lines in block 506 is not greater than or equal to the threshold number of lines, or in other words, the modifications to the page are considered sparse enough for encoding and caching, the circuitry in block 510 creates encoded data based on the new data and respective locations of the one or more identified lines in the page. This can include encoding a line position, the new data, and one or more intra-line positions for each modified line identified in block 504. In some implementations, the circuitry may execute an encoding module, such as encoding module 34 in FIG. 3. The circuitry may use a line-aware encoding scheme previously selected based on a degree of clustering of modifications to one or more other pages stored in the storage. Such line-aware encoding schemes can include, for example, the intra-line list encoding scheme of FIG. 4C, the intra-line bitmap encoding scheme of FIG. 4D, or a modification mapping entropy encoding scheme that uses a line mapping as in FIG. 4E. As noted above, the use of such line-aware encoding schemes can reduce the storage size of the encoded modifications for caching when there is a relatively higher degree of clustering of modifications, as compared to a delta list encoding scheme or other encoding scheme that does not consider the proximity of modifications in the page.

In block 512, the circuitry caches the encoded data created in block 510 in a cache (e.g., cache 12A or cache 12B in FIG. 1). The encoded data, or a portion thereof, can then be used at a later time to rewrite the page in the storage with the new data to reduce write amplification that would otherwise result from rewriting the page for each request to modify the page. The circuitry may execute a caching module, such as caching module 36 in FIG. 3, to cache the encoded modifications. In addition, the circuitry in block 512 may update a mapping table (e.g., mapping table 14A or mapping table 14B in FIG. 1) to indicate which data has been modified and cached for the page. New requests to modify the same data may then result in encoded modifications that replace the previously cached modifications in the cache.

Figure 6:
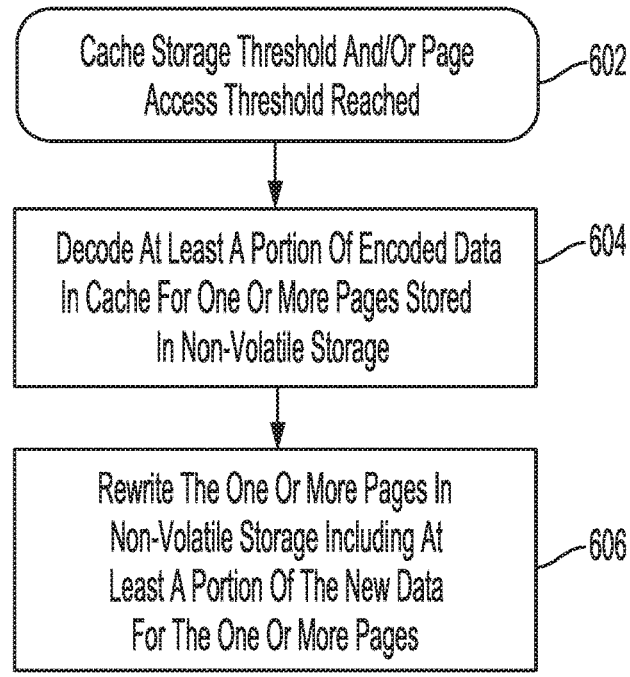
FIG. 6 is a flowchart for a page rewrite process according to one or more embodiments.

FIG. 6 is a flowchart for a page rewrite process according to one or more embodiments. The page rewrite process of FIG. 6 may be performed, for example, by processor circuitry 104 or controller circuitry 112 in FIG. 1 executing cache module 36, decoder module 38, and rewrite module 40 of FIG. 3.

In block 602, at least one of a cache memory threshold and an access threshold is reached. In some implementations, the circuitry may execute a caching module (e.g., caching module 36 in FIG. 3) that uses one or more cache policies to determine whether one or both of these thresholds is reached for flushing some or all of the encoded modifications stored in the cache. The cache memory threshold can include, for example, a threshold amount of data stored in the cache or a threshold amount of available storage remaining in the cache. The access threshold can include, for example, a number of access requests (e.g., read or write requests) for a page within a predetermined amount of time, and/or a predetermined amount of time since a page last received an access request.

The flushing of encoded data from the cache may or may not be specific to a particular page. For example, one implementation may flush encoded data from the cache for all pages that have not been modified within a predetermined period of time in response to reaching a cache memory threshold. In another example, the circuitry may flush the encoded data for all pages in response to reaching a cache memory threshold. Other cache policies may include flushing encoded data for pages that have reached an access threshold, regardless of the storage available in the cache or the size of the cached data.

In block 604, the circuitry decodes at least a portion of the encoded new data in the cache for one or more pages stored in the non-volatile storage in response to the cache memory threshold and/or the access threshold being reached in block 602. In some implementations, the circuitry may execute a decoding module (e.g., decoding module 38 in FIG. 3) that decodes the encoded modified data and associated encoded location information. The circuitry may access a mapping table to determine which decoder or decoding scheme to use to decode the encoded data. The decoded data may, for example, be temporarily stored in a memory accessed by the circuitry (e.g., main memory 106 or memory 114 in FIG. 1) for combining with the valid data read from the storage for the page, before rewriting the page with the new data.

In block 606, the circuitry rewrites the one or more pages in the non-volatile storage including at least a portion of the new data for the one or more pages. As noted above, some or all of the encoded modifications in the cache for a page may be overwritten while still in the cache. In such cases, the new modifications may overwrite the old modifications such that only a portion of the modifications in the cache (i.e., the new modifications) are included in the rewritten page in the storage. In some implementations, the circuitry may execute a rewrite module (e.g., rewrite module 40 in FIG. 3) for rewriting the page including the new data for the modifications.

As discussed above, in embodiments where the encoding and caching of modifications are performed by a host, the host may rewrite the page by first reading the page from the DSD, and modifying the page in its main memory, before sending a write command to the DSD to rewrite the page with the new data. Such an operation can be referred to as a page swap operation or read-modify-write operation performed by the host. In embodiments where the encoding and caching of modifications are performed by a DSD, the DSD may rewrite the page by first reading the page from the storage, and modifying the page in a local memory of the DSD, before rewriting the page in the storage with the new data. Such an operation can be referred to as a read-modify-write operation of the DSD.

Figure 7:
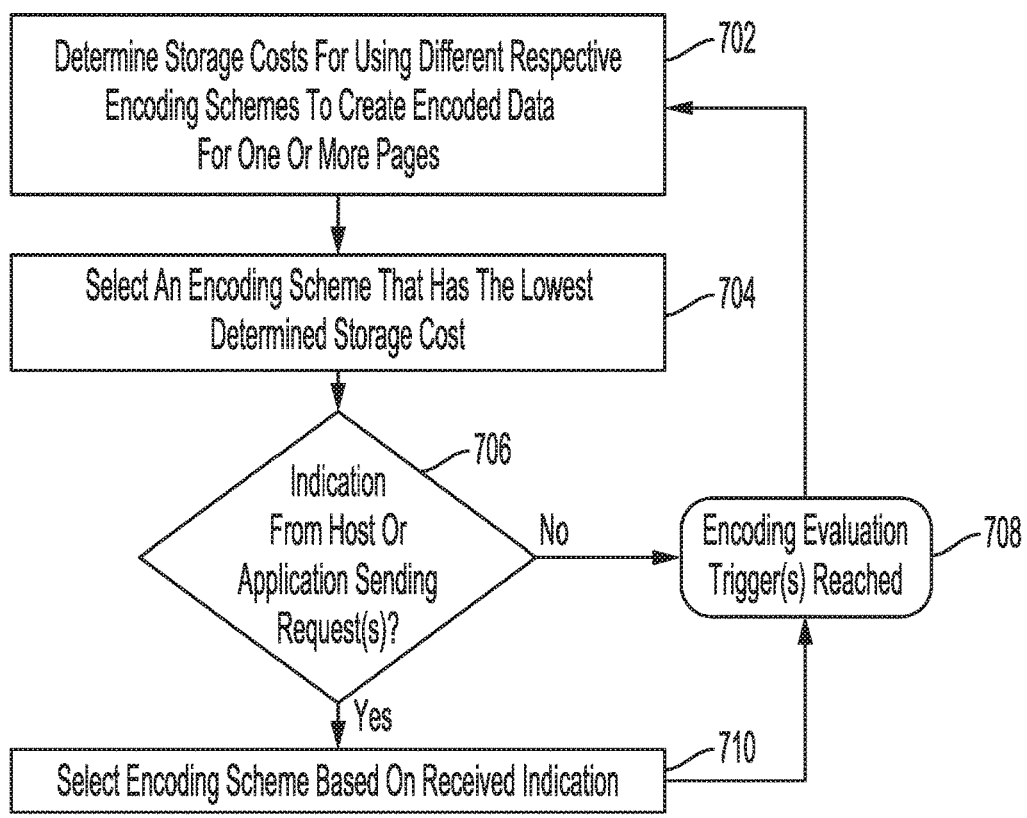
FIG. 7 is a flowchart for a first encoding selection process using determined storage costs according to one or more embodiments.

FIG. 7 is a flowchart for an encoding selection process according to one or more embodiments. The encoding selection process of FIG. 7 may be performed, for example, by processor circuitry 104 or controller circuitry 112 in FIG. 1 executing selector module 32 of FIG. 3.

In block 702, the circuitry determines storage costs for using different respective encoding schemes to create encoded data for one or more pages. As discussed above with reference to the example encoding schemes of FIGS. 4B to 4E, different encoding schemes can have different storage costs in terms of the storage size or compression ratio achieved depending on a degree of clustering of the modifications in a page. In some implementations, the circuitry may periodically analyze or sample modifications made to one or more pages stored in the storage to determine a storage cost, and evaluate whether to change a current encoding scheme to a different encoding scheme based on recent modification patterns.

In block 704, the circuitry selects an encoding scheme that has the lowest storage cost determined in block 702 for the one or more pages. For pages that have a higher degree of clustering, line-aware encoding schemes, such as the intra-line list encoding scheme of FIG. 4C, the intra-line bitmap encoding scheme of FIG. 4D, or the modification mapping entropy encoding scheme of FIG. 4E may be selected over a non-line-aware encoding scheme, such as the delta list encoding scheme of FIG. 4B. The selected encoding scheme may then be used for a predetermined period of time or until a different encoding evaluation trigger is reached.

In the example encoding selection process of FIG. 7, a host or application that sends one or more requests may indicate an encoding scheme to be used for the modifications. For example, an application may send a request to modify a page with a high degree of clustering and indicate that a particular line-aware entropy encoding should be used. Such an indication can include, for example, logical addresses that are associated with more or less clustering of modifications, or a value included with the request.

If it is determined in block 706 that an indication associated with an encoding scheme has been received from a host or application, the circuitry in block 710 selects an encoding scheme for encoding the requested modifications based on the received indication. Following the selection of an encoding scheme based on the indication from the host or application, the example process of FIG. 7 proceeds to block 708 to wait until one or more encoding scheme evaluation triggers are reached. In some implementations, the circuitry may revert back to the previously used encoding scheme after creating encoded data for the modifications of the request using the indicated encoding scheme. In other implementations, the circuitry may continue using the indicated encoding scheme until changed after reaching one or more evaluation triggers.

If an indication associated with an encoding scheme has not been received in block 706, the process proceeds to block 708 to wait until one or more encoding evaluation triggers are reached. Such encoding evaluation triggers can include, for example, reaching a predetermined time since a previous evaluation of encoding schemes, reaching a predetermined number of modifications to pages since a previous evaluation of encoding schemes, or reaching a predetermined number of rewritten pages in the storage since a previous evaluation of encoding schemes. Some implementations may reevaluate the encoding schemes upon reaching one evaluation trigger, while other implementations may require multiple evaluation triggers to be reached before reevaluating the encoding schemes. When such an evaluation trigger or evaluation triggers are reached, the process returns to block 702 to determine storage costs for using the different encoding schemes with a recent modification request or modification requests.

Figure 8:
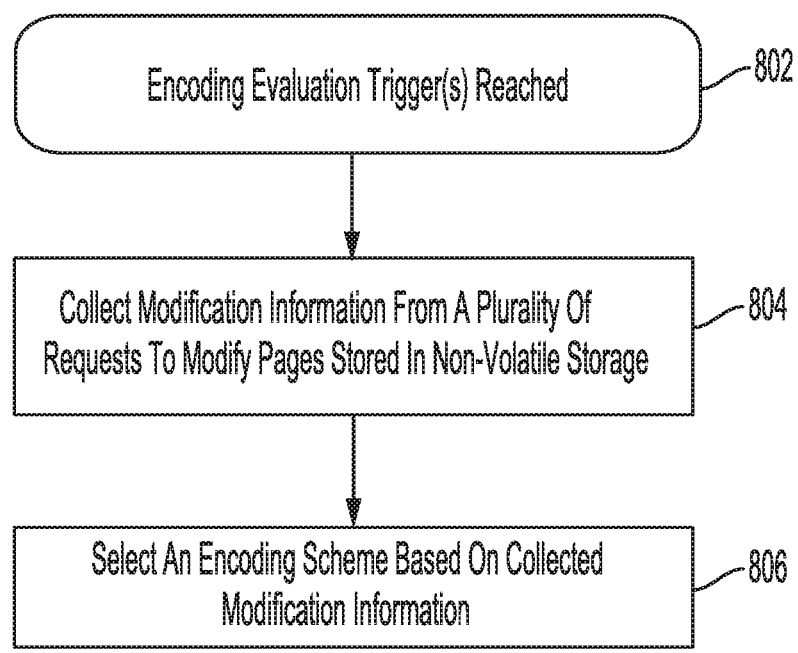
FIG. 8 is a flowchart for a second encoding selection process using collected modification information according to one or more embodiments.

FIG. 8 is a flowchart for another encoding selection process according to one or more embodiments. The encoding selection process of FIG. 8 may be performed, for example, by processor circuitry 104 or controller circuitry 112 in FIG. 1 executing selector module 32 of FIG. 3.

In block 802, one or more evaluation triggers are reached for evaluating the current encoding scheme. Such encoding evaluation triggers can include, for example, reaching a predetermined time since a previous evaluation of encoding schemes, reaching a predetermined number of modifications to pages since a previous evaluation of encoding schemes, or reaching a predetermined number of rewritten pages in the storage since a previous evaluation of encoding schemes. Some implementations may reevaluate the encoding schemes upon reaching one evaluation trigger, while other implementations may require multiple evaluation triggers to be reached before reevaluating the encoding schemes In block 804, the circuitry collects modification information from a plurality of requests to modify pages stored in a non-volatile storage (e.g., storage 116 in FIG. 1). The modification information may be collected for a predetermined number of modification requests or for a predetermined number of pages, for example. In some implementations, the modification information may be collected by a modification identification module executed by the circuitry, such as modification identification module 30 in FIG. 3.

The collected modification information in some implementations can indicate a degree of clustering of modifications. For example, the collected modification information can include statistics such as an average number of modifications for each modified line divided by the number of modifications being made to the page. In another example, the collected information can include the number of modifications made within different byte ranges of each other, such as the number of modifications made within 4 bytes, 8 bytes, and 16 bytes of another modification. The number of modifications made within these different byte ranges may then be divided by the number of modifications for the page to determine a degree of clustering for the modifications using the different sized byte ranges. Such different sized byte ranges may correspond to different possible line sizes that could be used for encoding modifications.

In block 806, the circuitry selects an encoding scheme (e.g., one of encoding schemes 0, 1, 2, or 3 discussed above) based on the collected modification information. For example, each encoding scheme may be associated with a threshold such that the collected information (e.g., an average number of modifications per modified line) may fall within a threshold for a particular encoding scheme. In another example, the circuitry may select an encoding scheme by changing the line size used for encoding to better suit the degree of clustering indicated by the collected modification information.

Those of ordinary skill in the art will appreciate with reference to the present disclosure that the encoding selection process of FIG. 8 may differ in other implementations. For example, other implementations may allow for a temporary or ongoing selection of an encoding scheme based on an indication received from a host, as with blocks 706 and 710 discussed above for the example of FIG. 7. In this regard, aspects of the encoding selection processes of FIGS. 7 and 8 may be combined in some implementations, such that the selection of an encoding scheme can be made based on collected modification information and/or determined storage costs.

As discussed above, the encoding and caching of modifications to pages stored in a non-volatile storage can reduce a write amplification in the non-volatile storage. The reduction in write amplification can ordinarily reduce an overall use of processing and memory resources that may otherwise be needed to perform multiple read-modify-write operations to rewrite pages for only a relatively small proportion of new data. This deferral of rewriting pages in the storage can also save time in terms of Input/Output (I/O) performance, and reduce the wear on storage that may have a limited write endurance.

In addition, the use of line-aware encoding schemes to create encoded data based on respective locations of modified lines in a page can ordinarily allow for more modifications to be accumulated in a cache to further reduce the frequency of rewriting pages. As disclosed herein, such line-aware encoding schemes can provide greater compression for modifications due to the tendency of applications to make modifications within close proximity to other modifications in the page.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor circuitry or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the circuitry may be any conventional processor circuitry, controller circuitry, microcontroller circuitry, or state machine. Processor circuitry or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor circuitry or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor circuitry or controller circuitry such that the circuitry can read information from, and write information to, the storage medium. In the alternative, the storage medium may be integral to processor circuitry or controller circuitry. The circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
a non-volatile storage configured to store data in pages;
a memory; and
controller circuitry configured to:
  receive one or more requests to modify a page stored in the non-volatile storage with new data;
  identify one or more lines in the page that include data to be modified by the one or more requests, wherein the identified one or more lines correspond to one or more respective byte ranges each of a fixed size in the page;
  create encoded data based on the new data and respective locations of the one or more identified lines in the page;
  cache the created encoded data in the memory;
  decode at least a portion of the encoded data cached in the memory; and
  rewrite the page in the non-volatile storage including at least a portion of the new data using the at least a portion of the decoded data.

2. The DSD of claim 1, wherein the controller circuitry is further configured to:
determine storage costs for using different respective encoding schemes to create encoded data for one or more pages, wherein the determined storage costs relate to a degree of clustering of modifications within identified lines that include at least one modification for the one or more pages; and
select an encoding scheme from among the different encoding schemes that has the lowest determined storage cost for creating encoded data for pages stored in the non-volatile storage.

3. The DSD of claim 2, wherein the controller circuitry is further configured to:
- determine new storage costs for using the different respective encoding schemes to create encoded data for one or more other pages, wherein the determined new storage costs relate to the degree of clustering of modifications within identified lines that include at least one modification for the one or more other pages; and
- determine whether to select a new encoding scheme from among the different encoding schemes based on the determined new storage costs.

4. The DSD of claim 1, wherein in creating the encoded data, the controller circuitry is further configured to use an entropy encoding.

5. The DSD of claim 4, wherein the entropy encoding includes arithmetic encoding.

6. The DSD of claim 1, wherein the controller circuitry is further configured to select an encoding scheme from among different encoding schemes for creating the encoded data based on an indication received from a host sending the one or more requests to the DSD.

7. The DSD of claim 1, wherein the controller circuitry is further configured to:
- determine whether the number of identified lines within the page is greater than or equal to a threshold number of lines; and
- in response to determining that the number of identified lines is greater than or equal to the threshold number of lines, rewrite the page in the non-volatile storage including the new data without creating encoded data based on the respective locations of the identified lines.

8. The DSD of claim 1, wherein in creating the encoded data, the controller circuitry is further configured to encode one or more respective intra-line positions for the new data of each identified line.

9. The DSD of claim 8, wherein encoding the one or more respective intra-line positions for the new data includes:
- (1) representing one or more intra-line positions with one or more respective values corresponding to one or more positions within the identified line, or
- (2) indicating the one or more intra-line positions in a bitmap representing positions within the identified line.

10. The DSD of claim 1, wherein in creating the encoded data, the controller circuitry is further configured to:
- generate at least one bit sequence for the one or more identified lines representing one or more respective line positions in the page, one or more respective intra-line positions for new data of each identified line, and the new data; and
- perform arithmetic encoding of the at least one bit sequence using:
  - (1) a line distribution of identified lines to other lines in the page for encoding the one or more line positions, and
  - (2) for each identified line, a respective intra-line distribution for encoding at least one of the one or more respective intra-line positions and the respective new data for the identified line.

11. The DSD of claim 1, wherein the fixed size of each of the identified one or more lines is a word size of processor circuitry generating the one or more requests.

12. The DSD of claim 1, wherein the controller circuitry is further configured to:
- collect modification information from a plurality of requests to modify pages stored in the non-volatile storage; and
- based on the collected modification information, select an encoding scheme for creating encoded data for pages stored in the non-volatile storage.

13. A method for modifying a page stored in a non-volatile storage, the method comprising:
- receiving one or more requests to modify data stored in the page with new data;
- identifying one or more lines in the page that include data to be modified by the one or more requests, wherein the identified one or more lines correspond to one or more respective byte ranges each of a fixed size in the page;
- creating encoded data based on the new data and respective locations of the one or more identified lines in the page; and
- caching the created encoded data; and
- wherein at least a portion the cached encoded data is used to rewrite the page in the non-volatile storage to include at least a portion of the new data.

14. The method of claim 13, further comprising:
- determining storage costs for using different respective encoding schemes to create the encoded data for one or more pages, wherein the determined storage costs relate to a degree of clustering of modifications within identified lines that include at least one modification for the one or more pages; and
- selecting an encoding scheme from among the different encoding schemes that has the lowest determined storage cost for creating the encoded data for pages stored in the non-volatile storage.

15. The method of claim 13, further comprising creating the encoded data using an entropy encoding.

16. The method of claim 15, wherein the entropy encoding includes arithmetic encoding.

17. The method of claim 13, further comprising selecting an encoding scheme from among different encoding schemes for creating the encoded data based on an indication received from a host or an application sending the one or more requests.

18. The method of claim 13, further comprising:
- determining whether the number of identified lines within the page is greater than or equal to a threshold number of lines; and
- in response to determining that the number of identified lines is greater than or equal to the threshold number of lines, rewriting the page in the non-volatile storage including the new data without creating encoded data based on the respective locations of the identified lines.

19. The method of claim 13, wherein in creating the encoded data, the method further comprises encoding one or more respective intra-line positions for the new data of each identified line.

20. The method of claim 19, wherein encoding the one or more respective intra-line positions for the new data includes:
- (1) representing the one or more intra-line positions with one or more respective values corresponding to one or more positions within the identified line, or
- (2) indicating the one or more intra-line positions in a bitmap representing positions within the identified line.

21. The method of claim 13, further comprising:
- generating at least one bit sequence for the one or more identified lines representing one or more respective line positions in the page, one or more respective intra-line positions for new data of each identified line, and the new data; and performing arithmetic encoding of the at least one bit sequence using:
(1) a line distribution of identified lines to other lines in the page for encoding the one or more line positions, and
(2) for each identified line, a respective intra-line distribution for encoding at least one of the one or more respective intra-line positions and the respective new data for the identified line.

22. The method of claim 13, wherein the fixed size of each of the identified one or more lines is a word size of processor circuitry generating the one or more requests.

23. The method of claim 13, further comprising:
collecting modification information from a plurality of requests to modify pages stored in the non-volatile storage; and
based on the collected modification information, selecting an encoding scheme for creating encoded data for pages stored in the non-volatile storage.

24. A host, comprising:
a main memory; and
means for:
receiving one or more requests to modify a page stored in a non-volatile storage with new data;
identifying one or more lines in the page that include data to be modified by the one or more requests, wherein the identified one or more lines correspond to one or more respective byte ranges each of a fixed size in the page;
creating encoded data based on the new data and respective locations of the one or more identified lines in the page; and
caching the created encoded data in the main memory; and
wherein at least a portion of the cached encoded data is used to rewrite the page in the non-volatile storage to include at least a portion of the new data.

* * * * *